United States Patent
Yasui et al.

(10) Patent No.: US 9,663,089 B2
(45) Date of Patent: May 30, 2017

(54) VEHICLE ELECTRIC BRAKING DEVICE

(71) Applicants: Yoshiyuki Yasui, Nagoya (JP);
Shinichiro Yukoku, Seto (JP);
Hiroyuki Kodama, Kariya (JP);
Satoshi Hirata, Kariya (JP); Naoki Yabusaki, Toyota (JP)

(72) Inventors: Yoshiyuki Yasui, Nagoya (JP);
Shinichiro Yukoku, Seto (JP);
Hiroyuki Kodama, Kariya (JP);
Satoshi Hirata, Kariya (JP); Naoki Yabusaki, Toyota (JP)

(73) Assignees: ADVICS CO., LTD., Kariya-Shi, Aichi-Ken (JP); TOYOTA JIDOSHA KABUSHIKI KAISHA, Toyota-Shi, Aichi (JP)

( * ) Notice: Subject to any disclaimer, the term of this patent is extended or adjusted under 35 U.S.C. 154(b) by 0 days.

(21) Appl. No.: 14/763,413

(22) PCT Filed: Jan. 27, 2014

(86) PCT No.: PCT/JP2014/051627
§ 371 (c)(1),
(2) Date: Jul. 24, 2015

(87) PCT Pub. No.: WO2014/115866
PCT Pub. Date: Jul. 31, 2014

(65) Prior Publication Data
US 2015/0360667 A1    Dec. 17, 2015

(30) Foreign Application Priority Data

Jan. 25, 2013  (JP) .................................. 2013-012494

(51) Int. Cl.
*F16D 65/00*    (2006.01)
*B60T 13/74*    (2006.01)
(Continued)

(52) U.S. Cl.
CPC .......... *B60T 13/746* (2013.01); *B60T 13/741* (2013.01); *F16D 55/227* (2013.01);
(Continued)

(58) Field of Classification Search
CPC ............... B60T 13/746; F16D 65/0056; F16D 65/0068; F16D 65/18; F16D 55/225; F16D 55/226; F16D 2121/24
(Continued)

(56) References Cited

U.S. PATENT DOCUMENTS 3,542,159 A  *  11/1970  Kestermeier ....... F16D 55/2255
                                                         188/106 F
4,350,229 A  *   9/1982  Ito ........................ F16D 55/227
                                                         188/73.32

(Continued)

FOREIGN PATENT DOCUMENTS

| JP | 11-280801 A | 10/1999 |
| JP | 2001-173691 A | 6/2001 |
| JP | 2008-240877 A | 10/2008 |

OTHER PUBLICATIONS

International Search Report (PCT/ISA/210) mailed on Apr. 28, 2014, by the Japanese Patent Office as the International Searching Authority for International Application No. PCT/JP2014/051627.

(Continued)

*Primary Examiner* — Christopher Schwartz
(74) *Attorney, Agent, or Firm* — Buchanan Ingersoll & Rooney PC

(57) ABSTRACT

A mount member is fixed to a support member by first and second fastening members, and a caliper is mounted to the mount member by first and second guide members. A motor axis of an electric motor and an axis of a shaft member configured to press a pressing member are different from each other. The electric motor is fixed to the caliper. When (Continued)

viewed from an axial direction of the first guide member, the motor axis is positioned inside a fastening quadrangle having four corners corresponding to positions of respective axes of, and is perpendicular to the axis, and the motor axis is orthogonal to a plane of the fastening quadrangle. As a result, there may be provided a vehicle electric braking device in which an axial direction dimension may be reduced to suppress an amplitude caused by vibration, and components sensitive to vibration influence are appropriately arranged.

4 Claims, 11 Drawing Sheets

(51) Int. Cl.
    *F16D 55/227*    (2006.01)
    *F16D 65/18*    (2006.01)
    *F16D 55/2265*    (2006.01)
    *F16D 66/00*    (2006.01)
    *F16D 121/24*    (2012.01)
    *F16D 125/40*    (2012.01)
    *F16D 125/48*    (2012.01)

(52) U.S. Cl.
    CPC ... *F16D 55/22655* (2013.01); *F16D 65/0056* (2013.01); *F16D 65/0062* (2013.01); *F16D 65/0068* (2013.01); *F16D 65/0087* (2013.01); *F16D 65/18* (2013.01); *F16D 2066/005* (2013.01); *F16D 2121/24* (2013.01); *F16D 2125/40* (2013.01); *F16D 2125/48* (2013.01)

(58) Field of Classification Search
    USPC .......... 188/71.1–71.9, 72.1–72.9, 73.1, 73.2, 188/73.31–73.39, 73.41–73.47, 156–164
    See application file for complete search history.

(56) References Cited

U.S. PATENT DOCUMENTS

| | | | | |
|---|---|---|---|---|
| 4,355,707 | A | * 10/1982 | Saito | ............... F16D 55/227 |
| | | | | 188/73.32 |
| 6,112,864 | A | 9/2000 | Suzuki et al. | |
| 7,152,716 | B2 | * 12/2006 | Taylor | ............... F16D 65/18 |
| | | | | 188/1.11 L |
| 2004/0016609 | A1 | * 1/2004 | Takeda | ............... F16D 55/227 |
| | | | | 188/73.31 |
| 2008/0264735 | A1 | 10/2008 | Matsushita et al. | |

OTHER PUBLICATIONS

Written Opinion (PCT/ISA/237) mailed on Apr. 28, 2014, by the Japanese Patent Office as the International Searching Authority for International Application No. PCT/JP2014/051627.

Annotated Photographs of electronic parking brake (EPB) for 2008 Audi A4 manufactured by TRW (2 pages).

* cited by examiner

VEHICLE ELECTRIC BRAKING DEVICE

TECHNICAL FIELD

The present invention relates to a vehicle electric braking device.

BACKGROUND ART

In JP11-280801 A (Japanese Laid Open Publication No. Hei 11-280801), there is a description that, in order to "prevent in advance a degradation in braking characteristic, generation of vibrations, and a degradation in assembly property caused by an imbalance in the weight of a carrier, thereby increasing durability and reliability", "a pin slide mechanism is constructed as follows: a pair of support portions are provided to a carrier fixed to a non-rotation portion of a vehicle; one of the support portions is provided at a distal end of an arm portion extending from the carrier to an inner side of the vehicle; and cylinder portions provided on both sides of a caliper main body are fitted via sleeves into pin portions of pin bolts that bridge between both the support portions and are tightened and fixed to the support portions from an outer side of the vehicle".

Further, in JP 11-280801 A, there is a description that "the caliper that is heavy due to the inclusion of the electric power device is supported by the both support portions stably in a manner of a double-support beam, thereby preventing an inclination of the caliper upon the braking, suppressing an increase in drag torque and a degradation in judder characteristic, and suppressing the generation of a vibration due to a pin clearance in the pin slide mechanism".

Referring to FIG. 11, a description is now given of a problem relating to a vibration caused by road surface irregularities when the vehicle is traveling. A case in which a beam X is supported by a member Y at points P1 and P2, and a vibration of an amplitude A is input from a point P0 is assumed. A portion between the points P1 and P2, which are the support points, forms a double-support beam, and hence the amplitude of a vibration is unlikely to be amplified at this portion. On the other hand, a point P3 or a point P4, which is an end point of the beam X, forms a cantilever, and hence the vibration may be amplified. Moreover, an increase amount of the amplitude increases as a distance from the support point increases. For example, the amplitude tends to be amplified more at the point P4 (distance L4 from the support point P2) than at the point P3 (distance L3 from the support point P1, which is shorter than the distance L4). As a result of the amplification of the amplitude, an acceleration acting on each position increases, and an excessive inertia thus acts on a member arranged at a place at which the amplitude amplification tends to occur.

It is important for an electric braking device arranged on a wheel side to appropriately balance the weight as well as to decrease a dimension (length) in an axial direction, thereby suppressing the amplitude of the device caused by the vibration input from the road surface. Further, in the device, sensitivity to the influence of the vibration depends on the component, and it is thus also important to arrange the components in consideration of components that are more sensitive to the influence of the vibration.

SUMMARY OF INVENTION

The present invention has been made in view of the above-mentioned problem, and therefore has an object to provide an electric braking device in which a dimension in an axial direction is reduced to suppress an amplitude caused by vibration, and components sensitive to influence of the vibration are appropriately arranged.

The vehicle electric braking device according to the present invention presses a friction member (MSB) through/via an electric motor (MTR) against a rotation member (KTB) fixed to a wheel (WHL) of a vehicle, to thereby generate a braking torque for the wheel (WHL).

The device includes: a mount member (MTB) fixed to a support member (NKL) configured to support the wheel (WHL); a first guide member (GD1) fixed to the mount member (MTB), and having an axis (Jgd1); a second guide member (GD2) fixed to the mount member (MTB) at a position different from a position of the first guide member (GD1), and having an axis (Jgd2) parallel to the axis (Jgd1) of the first guide member (GD1); a caliper (CPR) supported by the first guide member and the second guide member (GD1, GD2), the caliper (CPR) being movable relative to the first guide member and the second guide member (GD1, GD2) in an axial direction (ZH1 or ZH2) of the first guide member and the second guide member (GD1, GD2); a first fastening member (TK1) configured to fix the mount member (MTB) to the support member (NKL), and having an axis (Jtk1) parallel to the axis (Jgd1) of the first guide member (GD1); a second fastening member (TK2) configured to fix the mount member (MTB) to the support member (NKL) at a position different from a position of the first fastening member (TK1), and having an axis (Jtk2) parallel to the axis (Jgd1) of the first guide member (GD1); a shaft member (SFT) to be rotationally driven by the electric motor (MTR); and a conversion member (NJB) configured to convert a rotational motion of the shaft member (SFT) into a translational motion of the friction member (MSB) with respect to the rotation member (KTB), in which the electric motor (MTR) is fixed to the caliper (CRP).

Features of this device reside in that: a shaft axis (Jsf), which is a rotation axis of the shaft member (SFT), is different from a motor axis (Jmt), which is a rotation axis of the electric motor (MTR); and when viewed from the axial direction (ZH1 or ZH2) of the first guide member (GD1), the motor axis (Jmt) is positioned inside a fastening quadrangle (Mtk, quadrangle G-H-L-K), which is a quadrangle having a plane that has four corners corresponding to respective positions of the axis (Jgd1) of the first guide member (GD1), the axis (Jgd2) of the second guide member (GD2), the axis (Jtk1) of the first fastening member (TK1), and the axis (Jtk2) of the second fastening member (TK2), the plane being perpendicular to the axis (Jgd1) of the first guide member (GD1), and the motor axis (Jmt) is orthogonal to the plane of the fastening quadrangle (Mtk). In this case, it is preferable that the shaft axis (Jsf) be parallel to the motor axis (Jmt).

The caliper is supported on the mount member by the first and second guide members (slide pins) in a slidable state. Therefore, with respect to the direction of the wheel axis, as the component fixed to the caliper becomes away from the mount member, an influence from a vibration (particularly, in the direction perpendicular to the wheel axis) excited from the wheel side increases. Thus, such a configuration (so-called one-axis configuration) in which the electric motor, a speed reducer, the shaft member, the conversion member (rotation/translation conversion mechanism such as a screw member), and a pressing member (brake piston) are arranged in line is not preferred, because a length of the overall device in the axial direction is large, so that the device is easily affected by the vibration.

In contrast, the above-mentioned configuration employs such a configuration (so-called two-axis configuration) in which the electric motor and the brake piston have different two axes, and hence the dimension of the overall device in the axial direction may be reduced/short. As a result, the amplitude of the device caused by the vibration (particularly, in the direction perpendicular to the wheel axis) may be suppressed. In addition, the speed reducer may be arranged between the two axes. As a result, an inter-axis distance may be set to be long, and thus, the speed reduction ratio of the speed reducer may be set to be large.

Further, in the above-mentioned configuration, the mount member is fixed to the support member by the first and second fastening members, and the caliper is mounted to the mount member by the first and second guide members. Therefore, in terms of the road vibration (particularly, in the wheel axis direction), the vibration is more unlikely to be amplified as the position of the motor axis of the electric motor approaches the fastening quadrangle (quadrangle G-H-L-K, which is the fastening plane) that has the four corners corresponding to the respective positions of the four axes and is perpendicular to the axis. In the above-mentioned configuration, the motor axis of the electric motor, which is sensitive to the influence of the vibration, is arranged so that the motor axis is projected onto the fastening plane in parallel projection (that is, inside a fastening space), and is arranged so as to be orthogonal to the fastening plane. As a result, reliability of the electric motor against the vibration (particularly, in the direction perpendicular to the wheel axis) caused by road surface irregularities during the vehicle travel may be secured.

DESCRIPTION OF EMBODIMENTS

Figure 1:
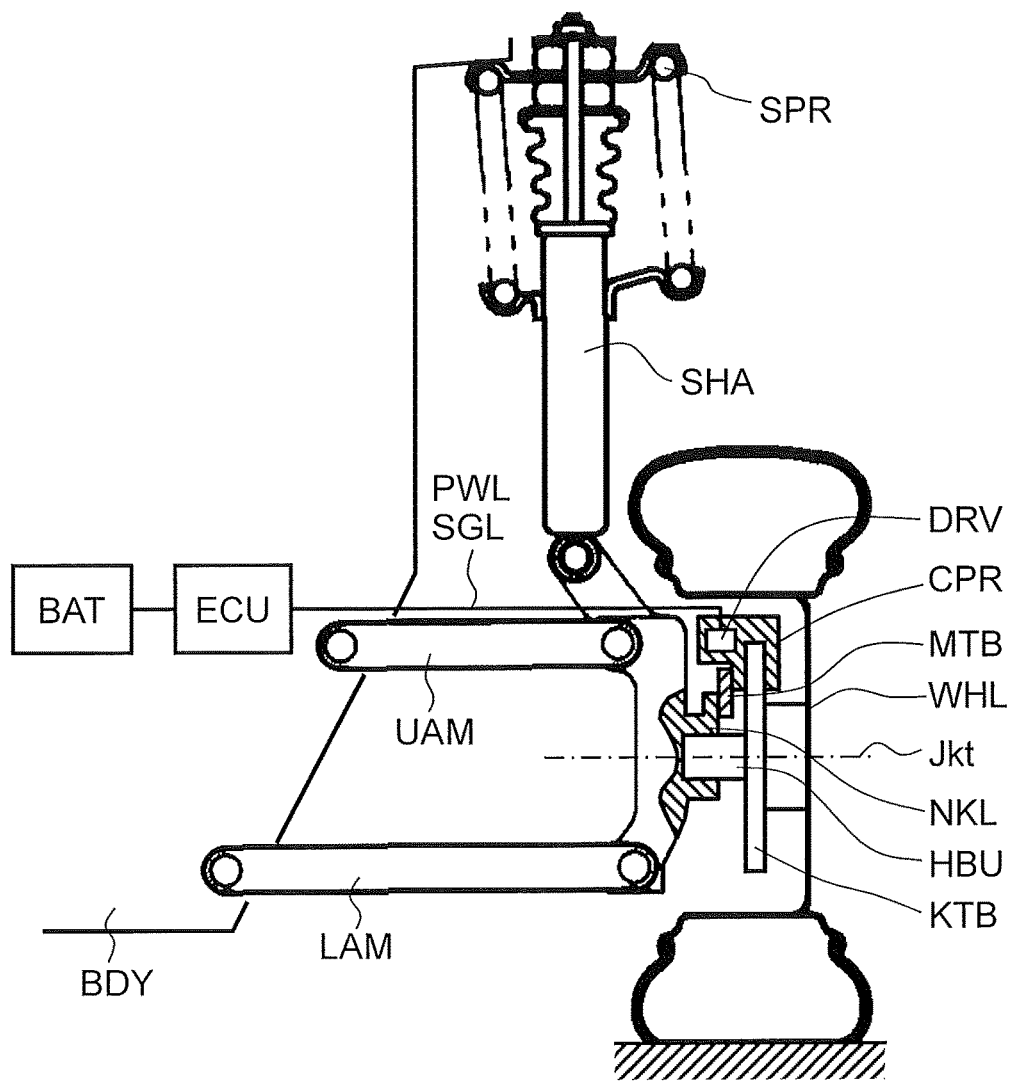
FIG. 1 is a schematic configuration diagram for illustrating a state in which an electric braking device is installed on a vehicle according to an embodiment of the present invention.

A description is now given of a vehicle electric braking device according to an embodiment of the present invention referring to the drawings.

<Overall Configuration of a Vehicle Including an Electric Braking Device According to Embodiment of Present Invention>

FIG. 1 is a diagram for illustrating a state in which the electric braking device according to the embodiment of the present invention is installed on a vehicle. The electric braking device applies a braking torque to a wheel in response to an operation amount of a braking operation member (such as a brake pedal) operated by a driver to generate a wheel braking force, thereby decelerating the traveling vehicle. In FIG. 1, a storage battery (battery) BAT supplies electric power to braking means (brake actuator) BRK and an electronic control unit ECU. BAT is provided on (fixed to) a vehicle body BDY. BAT supplies the electric power to drive means (drive circuit) DRV for driving an electric motor MTR via ECU and an electric power line PWL.

The electronic control unit ECU transmits a drive signal Imt to the drive circuit DRV via a signal line SGL based on a braking operation amount Bpa. ECU is provided on (fixed to) the vehicle body BDY. The drive circuit DRV is mounted in a caliper CPR, and comprises switching elements (e.g., S1) and a noise reduction circuit. Based on the drive signal (target current supply amount Imt) for MTR transmitted from ECU via the signal line SGL, the switching elements are driven to control a rotational direction and a rotational power of MTR. The electric power for driving MTR is supplied from BAT to DRV via ECU and the electric power line PWL. The signal line SGL and the electric power line PWL are generally referred to as "wire (wire harness)".

A power line communication in which the electric power line PWL is used also as the signal line (communication line) SGL can be employed. In this case, SGL is unified to PWL (that is, SGL is omitted), and Imt is superimposed on PWL and is transmitted to DRV. The power line communication is also referred to as a "power line communication (PLC)", and is a communication system using power supply wires PWL to carry out high-speed data communication.

One side of a suspension arm (for example, an upper arm UAM or a lower arm LAM) is supported by (mounted to) the vehicle body BDY of the vehicle, and the other side of the suspension arm is supported by (mounted to) a knuckle (corresponding to a support member) NKL. A coil spring SPR and a shock absorber SHA are supported by (mounted to) the suspension arm or the knuckle NKL. A wheel WHL is suspended by/on the vehicle body BDY by the coil spring SPR and the shock absorber SHA. The suspension arm, SPR, NKL, and SHA are members for constructing a publicly known suspension device.

A hub bearing unit HBU is fixed to the support member (knuckle) NKL. The wheel WHL is supported by/on a hub bearing in the hub bearing unit HBU. A rotation member (brake disk) KTB is fixed to the wheel WHL, and KTB is rotated together with WHL (that is, a rotation axis of KTB and a rotation axis of WHL are coaxial).

A mounting bracket (corresponding to a mount member) MTB is fixed to the knuckle (corresponding to the support member) NKL by fastening members (such as bolts) TK1 and TK2 (not shown). The caliper CPR is supported by (mounted to) the mount member MTB via guide members GD1 and GD2 (slide pins fastened to MTB by pin bolts PB1 and PB2 (not shown)).

The brake caliper CPR is a floating caliper, and is configured to clamp/sandwich the rotation member (disk brake) KTB with two friction members (brake pads) MSB. Specifically, the slide pins GD1 and GD2 are fixed to the mount member MTB, and a pressing member PSN in the caliper CRP is slid along GD1 and GD2 toward the rotation member KTB by the electric motor MTR.

Figure 2:
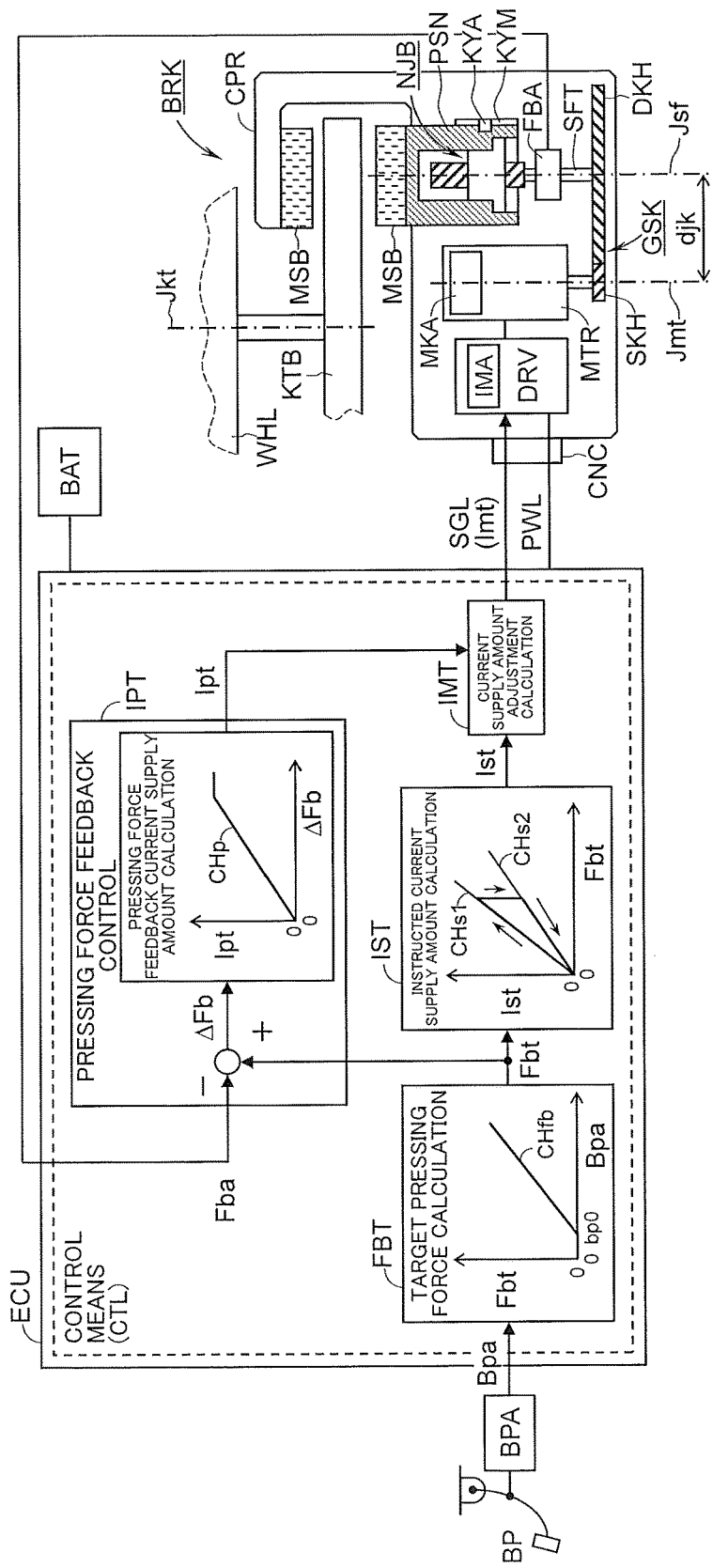
FIG. 2 is an overall configuration diagram of braking means and control means illustrated in FIG. 1.

As illustrated in FIG. 2, the vehicle including this electric braking device includes the braking operation member BP, the electronic control unit ECU, the braking means (brake actuator) BRK, and the storage battery (battery) BAT.

The braking operation member (for example, the brake pedal) BP is a member operated by the driver for decelerating the vehicle. Based on the operation amount of BP, the barking means (brake actuator) BRK adjusts a braking torque of the wheel WHL to generate a braking force on the wheel WHL, to thereby decelerate the traveling vehicle.

Braking operation amount acquisition means BPA is provided to the braking operation member BP. The braking operation amount acquisition means BPA acquires (detects) the operation amount (braking operation amount) Bpa of the braking operation member BP changed by the driver. As the braking operation amount acquisition means BPA, a sensor (pressure sensor) which detects a pressure of a master cylinder (not shown), and a sensor (a brake pedal depressing force sensor, or a brake pedal stroke sensor) which detects at least one of an operation force or a displacement amount of the braking operation member BP are employed. Thus, the braking operation amount Bpa is calculated based on at least one of the master cylinder pressure, the brake pedal depressing force, and the brake pedal stroke. The braking operation amount Bpa is input to the electronic control unit ECU. Note that, Bpa may be calculated or acquired by another electronic control unit, and the calculated value (signal) may be transmitted to ECU via a communication bus.

The electronic control unit ECU internally includes programmed control means (control algorithm) CTL for controlling the braking means BRK, and controls BRK based on the program. The storage battery BAT is an electric power supply for supplying the electric power to BRK, ECU, and the like.

[Control Means CTL]

The control means CTL includes a target pressing force calculation block FBT, an instructed current supply amount calculation block IST, a pressing force feedback control block IPT, and a current supply amount adjustment calculation block IMT. The control means (control program) CTL is programmed inside the electronic control unit ECU.

In the target pressing force calculation block FBT, a target pressing force Fbt for each wheel WHL is calculated based on the braking operation amount Bpa and a target pressing force calculation characteristic (calculation map) CHfb set in advance. Fbt is a target value of a pressing force, which is a force applied by the friction members (brake pads) MSB to press the rotation member (brake disk) KTB in the electric braking means BRK.

In the instructed current supply amount calculation block IST, an instructed current supply amount Ist is calculated based on calculation characteristics (calculation map) CHs1 and CHs2 of the instructed current supply amount that are set in advance, and the target pressing force Fbt. Ist is a target value of the current supply amount supplied to the electric motor MTR for driving the electric motor MTR in the electric braking means BRK to achieve the target pressing force Fbt. The calculation map for Ist includes the two characteristics CHs1 and CHs2 in consideration of a hysteresis of the electric braking means BRK. The characteristic CHs1 corresponds to a case in which the pressing force is increased, and the characteristic CHs2 corresponds to a case in which the pressing force is decreased. Therefore, as compared with the characteristic CHs2, the characteristic CHs1 is set so as to output a relatively large instructed current supply amount Ist.

The current supply amount is a state amount (variable) for controlling the output torque of the electric motor MTR. The electric motor MTR outputs a torque approximately proportional to the current, and hence a current target value for the electric motor MTR may be used as the target value of the current supply amount. Moreover, when a voltage supplied to the electric motor MTR is increased, the current is increased as a result, and hence the supplied voltage value may be used as the target current supply amount. Further, the supplied voltage value can be adjusted by a duty ratio in the pulse width modulation (PWM), and hence the duty ratio may be used as the current supply amount.

In the pressing force feedback control block IPT, a pressing force feedback current supply amount Ipt is calculated based on the target pressing force (target value) Fbt and an actual pressing force (actual value) Fba. The instructed current supply amount Ist is calculated as a value corresponding to the target pressing force Fbt, but an error (steady state error) may be generated between the target pressing force Fbt and the actual pressing force Fba due to an efficiency variation in the electric braking means BRK. The pressing force feedback current supply amount Ipt is calculated based on a deviation (pressing force deviation) ΔFb between the target pressing force Fbt and the actual pressing force Fba and a calculation characteristic (calculation map) CHp set in advance, and is determined so as to decrease the above-mentioned error. Note that, the actual pressing force Fba is acquired (detected) by pressing force acquisition means FBA which will be described later.

In the current supply amount adjustment calculation block IMT, the target current supply amount Imt, which is a final target value for the electric motor MTR, is calculated. In IMT, the instructed current supply amount Ist is adjusted by the pressing force feedback current supply amount Ipt to calculate the target current supply amount Imt. Specifically, the feedback current supply amount Ipt is added to the instructed current supply amount Ist, so that the sum is calculated as the final target current supply amount Imt. Then, a rotational direction (a forward rotational direction for increasing the pressing force or a backward rotational direction for decreasing the pressing force) of the electric motor MTR is determined based on the sign (plus or minus of the value) of the target current supply amount Imt, and the output (rotational power) of the electric motor MTR is controlled based on a magnitude of the target current supply amount Imt.

[Braking Means (Brake Actuator) BRK]

The braking means BRK includes the brake caliper (floating caliper) CPR, the electric motor (brush motor or brushless motor) MTR, the drive means (drive circuit for MTR) DRV, a speed reducer GSK, a shaft member SFT, a screw member NJB, the pressing member (brake piston) PSN, position detection means MKA, current supply amount acquisition means IMA, and the pressing force acquisition means FBA.

The braking means (brake actuator) BRK has a configuration (that is, a two-axis configuration) including two axes, which are an axis (motor axis, which is a rotation axis) Jmt of the electric motor MTR and an axis (shaft axis, which is a rotation axis) Jsf of the shaft member SFT. The position acquisition means (rotational angle sensor) MKA and a smaller diameter gear SKH of the speed reducer GSK are provided to the motor axis Jmt, in addition to MTR. Moreover, the screw member NJB, the pressing member PSN, the pressing force acquisition means FBA, and a larger diameter gear DKH of the speed reducer GSK are provided to the shaft axis Jsf, in addition to SFT. The respective components (such as MTR and DRV) of the braking means BRK are provided inside the caliper CPR. The caliper CPR is fixed to the mounting bracket (corresponding to the mount member) MTB in a slidable state. The mount member MTB is provided/mounted to the knuckle (corresponding to the support member) NKL.

The drive instructed value (target current supply amount) Imt for MTR is transmitted from the electronic control unit ECU to the braking means BRK via the signal line SGL, and the drive electric power for MTR is transmitted from the electronic control unit ECU to the braking means BRK via the electric power line PWL. A connector CNC is fixed onto a surface of the caliper CPR, and Imt and the electric power are taken into the drive circuit DRV via the connector CNC. The electric motor MTR is driven by DRV to generate the rotational power.

The output (rotational power about the motor axis Jmt) of the electric motor MTR is transmitted to the shaft member SFT via the speed reducer GSK. The rotational power (torque about the shaft axis Jsf) of the shaft member SFT is converted into linear power (thrust in a pressing axis Jps direction) by the screw member NJB, which is a motion conversion member, and is transmitted to the pressing member PSN. Then, the pressing member (brake piston) PSN is moved forward/backward with respect to the rotation member (brake disk) KTB. As a result, the force (pressing force) Fba applied by the friction members (brake pads) MSB to press the rotation member KTB is adjusted. The rotation member KTB is fixed to the wheel WHL, and hence a friction force is generated between the friction members MSB and the rotation member KTB, so that the braking force on the wheel WHL is adjusted, with the result that, for example, the traveling vehicle is decelerated. Note that, as the conversion member for converting the rotational motion into the translational/linear motion, in place of the screw member NJB, a conversion mechanism such as a ball-and-ramp member, a rotating wedge member, and a rack-and-pinion member may be employed.

As described above, the brake caliper CPR is a floating caliper, and is configured to clamp/sandwich the rotation member (brake disk) KTB with the two friction members (brake pads) MSB. In the caliper CPR, the pressing member PSN is slid and moved forward/backward with respect to the rotation member KTB. A keyway KYM is formed in the caliper CPR so as to extend in the rotation axis (shaft axis Jsf) direction of the shaft member SFT.

The pressing member (brake piston) PSN presses the friction members MSB against the rotation member KTB, thereby generating the friction force. A key member KYA is fixed to the pressing member PSN. When the key member KYA is fitted into the keyway KYM, the pressing member PSN is restricted in the rotational motion about the shaft axis, but the translational motion in a direction of the shaft axis (lengthwise direction of the keyway KYM) is permitted.

A brushed motor or a brushless motor is employed as the electric motor MTR. Regarding the rotational direction of the electric motor MTR, a forward rotational direction corresponds to a direction in which the friction members MSB approach the rotation member KTB (direction in which the pressing force increases and the braking torque increases), and a backward rotational direction corresponds to a direction in which the friction members MSB become away from the rotation member KTB (direction in which the pressing force decreases and the braking torque decreases).

The output of the electric motor MTR is determined based on the target current supply amount Imt calculated by the control means CTL. Specifically, when the sign of the target current supply amount Imt is plus (Imt>0), the electric motor MTR is driven in the forward rotational direction, and when the sign of Imt is minus (Imt<0), the electric motor MTR is driven in the backward rotational direction. Moreover, the rotational power of the electric motor MTR is determined based on the magnitude (absolute value) of the target current supply amount Imt. In other words, as the absolute value of the target current supply amount Imt increases, the output torque of the electric motor MTR increases, and as the absolute value of the target current supply amount Imt decreases, the output torque of the electric motor MTR decreases.

The position acquisition means (for example, a rotational angle sensor) MKA detects a position (for example, a rotational angle) Mka of a rotor of the electric motor MTR. The position acquisition means MKA is arranged inside the electric motor MTR so as to be coaxially with MTR (arranged on the motor axis Jmt).

In the drive means (electric circuit for driving the electric motor MTR) DRV, the current supply amount (finally, the current value) to the electric motor MTR is controlled based on the target current supply amount (target value) Imt. Specifically, the drive means DRV includes a bridge circuit in which a plurality of switching elements (power transistors such as MOS-FETs or IGBTs) are used. Those elements are driven based on the target current supply amount Imt of the electric motor, thereby controlling the output of the electric motor MTR. Specifically, the rotational direction and the output torque of the electric motor MTR are adjusted by switching the current supply/non-current supply state of the switching elements.

Noise reduction circuits (stabilization circuits) LPFp and LPFt for reducing a voltage fluctuation and the like are provided in the drive circuit DRV. The noise reduction circuits LPFp and LPFt are so-called LC circuits, and include combinations of inductors (coils) IND and capacitors CND.

The current supply amount acquisition means (for example, a current sensor) IMA acquires (detects) an actual current supply amount (for example, a current actually flowing through the electric motor MTR) Ima supplied to the electric motor MTR. The current supply amount acquisition means IMA is provided inside the drive circuit DRV for the electric motor.

The connector CNC is provided onto the surface of the caliper CPR. The electronic control unit ECU (arranged on the vehicle body BDY) and the drive circuit DRV (arranged inside the caliper CPR) are connected to each other via the wires (signal line SGL and electric power line PWL) relayed by CNC. The signal line SGL transmits the target current supply amount Imt from ECU to DRV via the connector CNC. Moreover, the electric power line PWL supplies the electric power for driving the electric motor MTR from ECU to DRV via the connector CNC.

The speed reducer GSK reduces the rotational speed of the electric motor MTR, and outputs the reduced rotational speed to the shaft member SFT. In other words, the rotational output (torque) of MTR is increased in accordance with a speed reduction ratio of the speed reducer GSK, so that the rotational force (torque) of the shaft member SFT is generated. For example, GSK includes the smaller diameter gear SKH and the larger diameter gear DKH. As GSK, a wrapping transmission mechanism such as a belt or a chain or a friction transmission mechanism may be used in place of the gear transmission mechanism.

The shaft member SFT is a rotational shaft member, and transmits the rotational power transmitted from the speed reducer GSK to the screw member NJB.

The screw member NJB is a conversion member for converting the rotational power of the shaft member SFT into the translational power. In other words, the screw member NJB is a rotation/translation conversion mechanism. The screw member NJB includes a nut member NUT and a bolt member BLT. The screw member NJB has reversibility (has reverse efficiency), and can thus carry out bidirectional transmission of the power. In other words, when the braking torque is increased (pressing force Fba is increased), the power is transmitted from the shaft member SFT to the pressing member PSN via the screw member NJB. On the other hand, when the braking torque is decreased (pressing force Fba is decreased), the power is transmitted from the pressing member PSN to the shaft member SFT via the screw member NJB (reverse efficiency is more than "0").

The screw member NJB is constructed by a slide screw (such as a trapezoidal thread screw) for transmitting power by means of "slide". In this case, a female thread (internal thread) MNJ is formed in the nut member NUT. A male thread (external thread) ONJ is formed in the bolt member BLT, and is threadedly engaged with MNJ of NUT. The rotational power (torque) transmitted from the shaft member SFT is transmitted via the screw member NJB (ONJ and MNJ) as the translational power (thrust) of the pressing member PSN. Moreover, in place of the slide screw, a rolling screw (such as a ball screw) for transmitting power by means of "rolling" may be employed as the screw member NJB. In this case, ball grooves are formed in a nut member NUTb and a bolt member BLTb. The power is transmitted via balls (steel balls) BAL fitted into the ball grooves.

The pressing force acquisition means FBA acquires (detects) a reaction force (reaction) for the force (pressing force) Fba applied by the pressing member PSN to press the friction members MSB. An elastic body is formed in FBA, and a deformation thereof is detected by a deformation detection element, to thereby acquire Fba. For example, an element (strain gauge) by means of a change in electric resistance, an element by means of ultrasonic, or the like may be used as the deformation detection element. FBA is arranged between the shaft member SFT and the caliper CPR. FBA is fixed to the caliper CRP. The detected pressing force Fba is an analog signal, and is converted into a digital signal via analog/digital conversion means provided in the electronic control unit ECU, when the analog signal is input to ECU.

<Drive Means (Drive Circuit) DRV for Case of Employing Brushed Motor>

Figure 3:
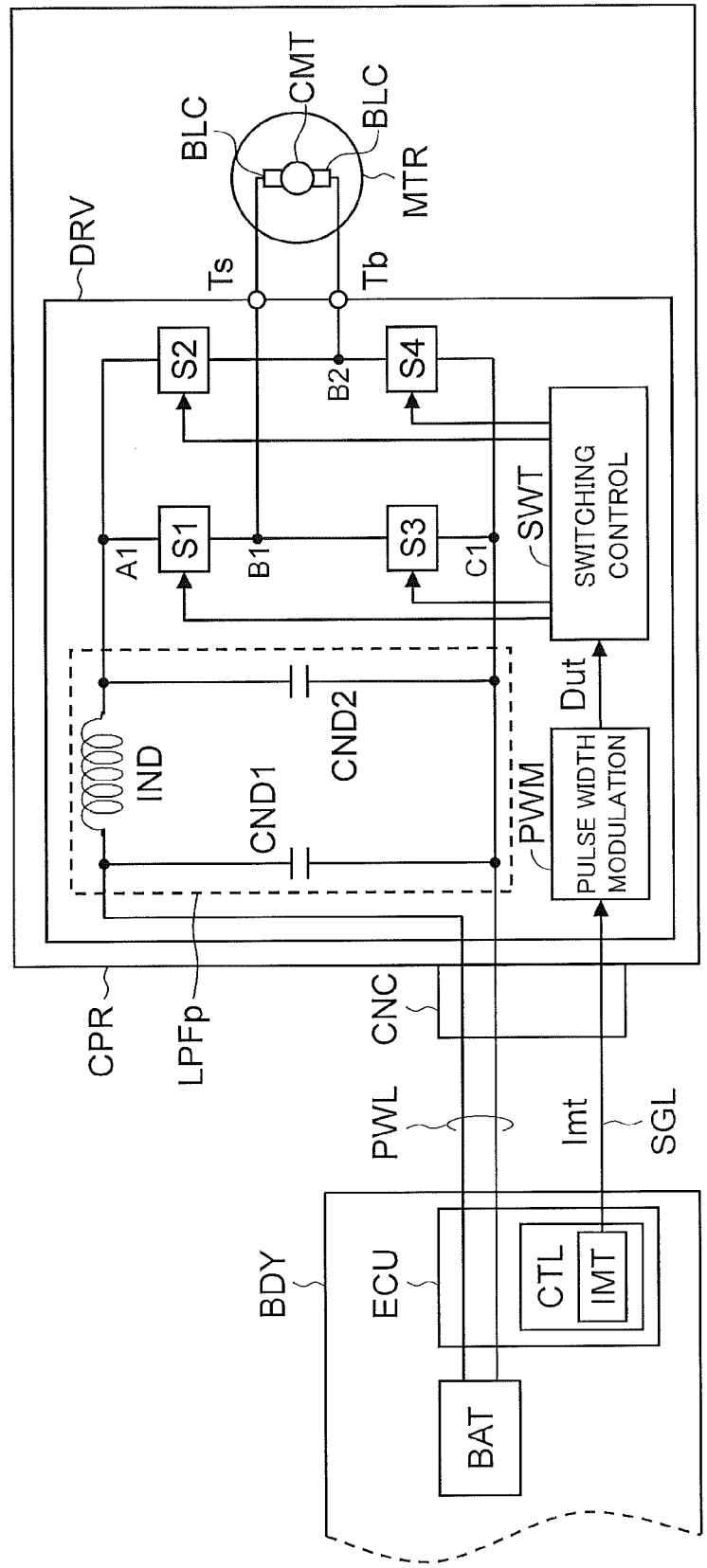
FIG. 3 is an overall configuration diagram of drive means for a case in which a brushed motor is employed as an electric motor illustrated in FIG. 1.

FIG. 3 shows an example of the drive means (drive circuit) DRV for a case in which a brushed motor (also simply referred to as "brush motor") is used as the electric motor MTR. The brushed motor is also referred to as "commutator motor", and, in this electric motor, a current flowing through an armature (electromagnet formed by windings) is switched by a mechanical commutator (commutator) CMT and brushes BLC depending on a rotational phase. In other words, a mechanical rotary switch is constructed by the commutator CMT and the brushes BLC, and the current to the winding circuit is alternately inverted. In the brushed motor, a stator is constructed by permanent magnets, and a rotor is constructed by the winding circuit (electromagnet). The brushes BLC are in contact with the commutator CMT so as to supply the electric power to the winding circuit (rotor). The brushes BLC are pressed against the commutator CMT by springs (elastic bodies), and the current is commutated by the rotation of the commutator CMT.

The position acquisition means MKA for detecting the position Mka of the rotor of the electric motor MTR is provided inside the electric motor MTR. MKA is arranged coaxially with the rotor and the commutator (that is, on the motor axis Jmt).

The drive means DRV is an electric circuit for driving the electric motor MTR, and includes the switching elements S1 to S4, a pulse width modulation block PWM for carrying out the pulse width modulation (PWM) based on Imt, and a switching control block SWT for controlling a current supply state/a non-current supply state of S1 to S4 based on a duty ratio determined by the PWM. For the brushed motor MTR, the brushes BLC and the commutator CMT are provided. DRV and MTR are mounted on the wheel side, and are fixed to CPR. The drive signal and the electric power are supplied from ECU mounted on the vehicle body side to the drive circuit DRV via the connector CNC using the signal line SGL and the electric power line PWL.

The switching elements S1 to S4 are elements capable of turning on/off a part of the electric circuit, and, for example, MOS-FETs may be used. A bridge circuit for the forward rotational direction and the backward rotational direction of MTR is formed by S1 to S4. The forward rotational direction of MTR is the rotational direction causing MSB to approach KTB, increasing the braking torque, and increasing the deceleration of the traveling vehicle, and the backward rotational direction of MTR is the rotational direction causing MSB to become away from KTB, decreasing the braking torque, and decreasing the deceleration of the traveling vehicle. The switching control block SWT controls S1 and S4 to be in the current supply state (on state) and S2 and S3 to be in the non-current supply state (off state), for the forward rotational direction. Moreover, the switching control block SWT controls S1 and S4 to be in the non-current supply state (off state) and S2 and S3 to be in the current supply state (on state), for the backward rotational direction.

When a high output is required for MTR, a large current flows through the switching elements S1 to S4. In this case, heat is generated by the switching elements S1 to S4, and heat sinks may thus be arranged on S1 to S4. Specifically, metal plates (for example, aluminum plates) having high heat conductivity may be fixed to S1 to S4.

In the pulse width modulation block PWM, the duty ratio (ratio between periods of on and off) of the pulse width is determined based on the magnitude of Imt, and the rotational direction of MTR is determined based on the sign (plus sign or minus sign) of Imt. For example, regarding the rotational direction of MTR, the forward rotational direction may correspond to a plus value, and the backward rotational direction may correspond to a minus value. The final output voltage is determined by the input voltage (voltage of BAT) and the duty ratio, and therefore, DRV controls the rotational direction and the output torque of MTR.

In DRV, a filter circuit (LC circuit, and also referred to as "LC filter") for noise reduction (reduction in electric power fluctuation) is formed by combining at least one capacitor and at least one inductor (coil) in order to stabilize the supplied electric power. For example, first and second capacitors CND1 and CND2 and an inductor IND may be combined to form a low-pass filter ($\pi$ filter) LPFp, to thereby reduce the noise. Specifically, the $\pi$ low-pass filter LPFp is a filter constructed by the two capacitors CND1 and CND2 parallel to a line, and the one series inductor, and is a so-called Chebyshev low-pass LC filter. In general, the inductor is more expensive than the capacitor, and a component cost is suppressed by employing LPFp, resulting in an excellent performance. Moreover, as the noise reduction filter, in place of LPFp, a T low-pass filter LPFt which will be described later may be employed (refer to FIG. 4 which will be described later).

<Drive Means (Drive Circuit) DRV for Case of Employing Brushless Motor>

Figure 4:
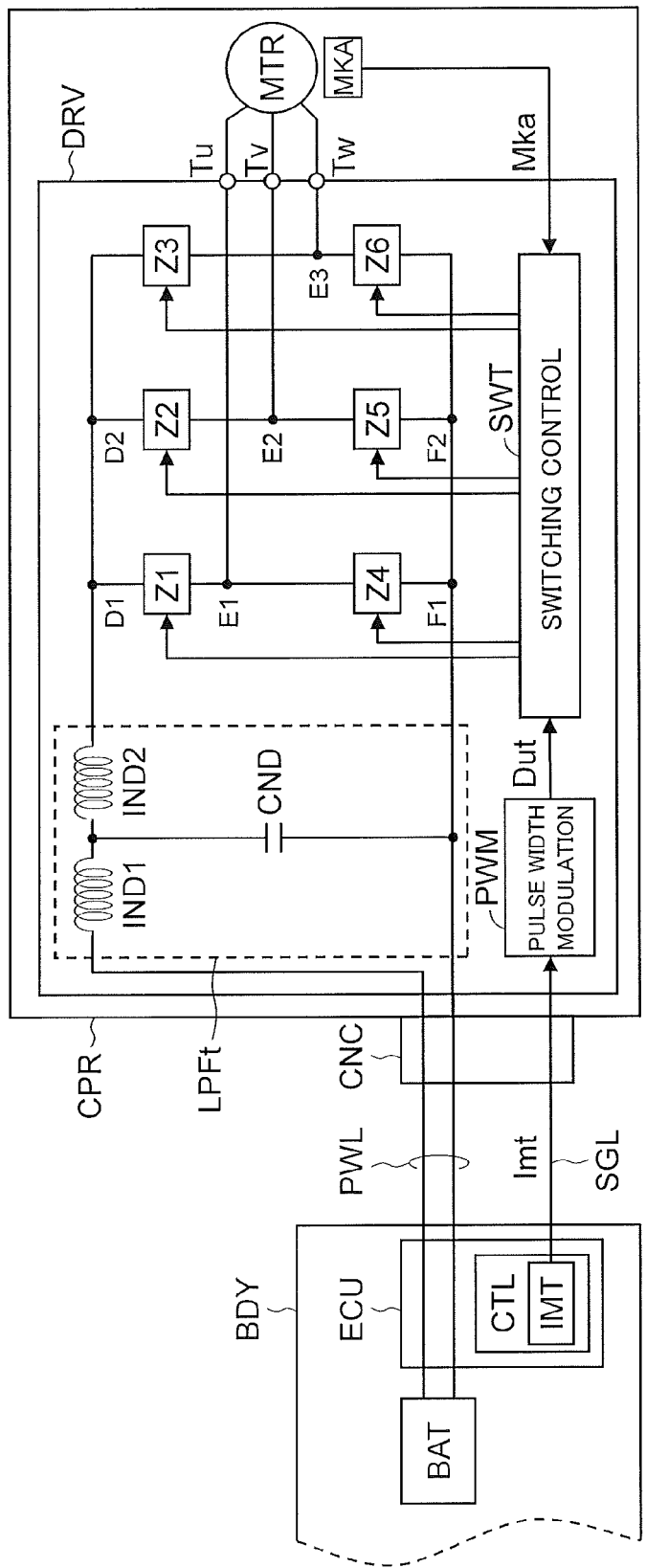
FIG. 4 is an overall configuration diagram of the drive means for a case in which a brushless motor is employed as the electric motor illustrated in FIG. 1.

FIG. 4 shows an example of the drive means (drive circuit) DRV for the case in which the electric motor MTR is a brushless motor (three-phase brushless motor). The brushless motor is also referred to as "brushless direct current motor", and, in this electric motor, the current is commutated by an electric circuit in place of the mechanical commutator CMT of the brushed motor. The brushless motor has such a construction that the rotor is a permanent magnet and the stator is a winding circuit (electromagnet). A rotational position Mka of the rotor is detected, and the supply current is commutated by switching the switching elements in response to Mka. The position Mka of the rotor is detected by the position acquisition means MKA provided inside the electric motor MTR.

The drive means DRV is the electric circuit for driving MTR, and is constructed by switching elements Z1 to Z6, the pulse width modulation block PWM for carrying out the pulse width modulation based on Imt, and the switching control block SWT for controlling a current supply state/non-current supply state of each of Z1 to Z6 based on the duty ratio determined by PWM. As in the case of the brushed motor, DRV and MTR are provided on the wheel side, and are fixed to CPR. The drive signal and the electric power are supplied from the electronic control unit ECU provided on the vehicle body side to the drive circuit DRV via the connector CNC using the signal line SGL and the electric power line PWL.

In the brushless motor, the position acquisition means MKA acquires the rotor position (rotational angle) Mka of MTR. Then, in the switching control block SWT, the switching elements Z1 to Z6 constructing the three-phase bridge circuit are controlled in accordance with the actual position Mka. A direction (that is, an excitation direction) of a coil current supply amount for a U phase, a V phase, and a W phase of the bridge circuit is sequentially switched so as to drive MTR, using the switching elements Z1 to Z6. The rotational direction (forward rotation or backward rotation) of the brushless motor is determined in accordance with a relationship between the rotor and a position of the excitation. As in the case of the brushed motor, the forward rotational direction is the rotational direction causing MSB to approach KTB, increasing the braking torque, and increasing the deceleration of the traveling vehicle, and the backward rotational direction is the rotational direction causing MSB to become away from KTB, decreasing the braking torque, and decreasing the deceleration of the traveling vehicle. Also in the brushless motor, because of the heat radiation upon the request for the high output, heat sinks (for example, aluminum plates) are fixed to the switching elements Z1 to Z6. Moreover, in PWM, based on the magnitude of Imt, the duty ratio for the pulse width is determined, and, based on the sign (plus or minus of the value) of Imt, the rotational direction of MTR is determined. The rotational direction and the output torque of MTR are controlled by controlling the switching elements Z1 to Z6 through use of signals from SWT based on the target current supply amount Imt.

Further, in DRV, a filter circuit (LC circuit, and also referred to as "LC filter") for noise reduction (reduction in electric power fluctuation) is formed by combining at least one capacitor and at least one inductor (coil) in order to stabilize the supplied electric power. For example, a capacitor CND and first and second inductors IND1 and IND2 may be combined to form the low-pass filter (T filter) LPFt, to thereby reduce the noise. Specifically, the T filter LPFt is constructed by the two series inductors IND1 and IND2 and the one parallel capacitor CND. This filter configuration may reduce the coupling between inputs and outputs, and may increase an attenuation performance (attenuation amount in attenuation band) for higher harmonic waves. Moreover, as the noise reduction filter, in place of the T low-pass filter LPFt, the π low-pass filter LPFp described above may be employed.

<Arrangement of Electronic Components (Such as Switching Element S1) in Caliper>

Figure 5:
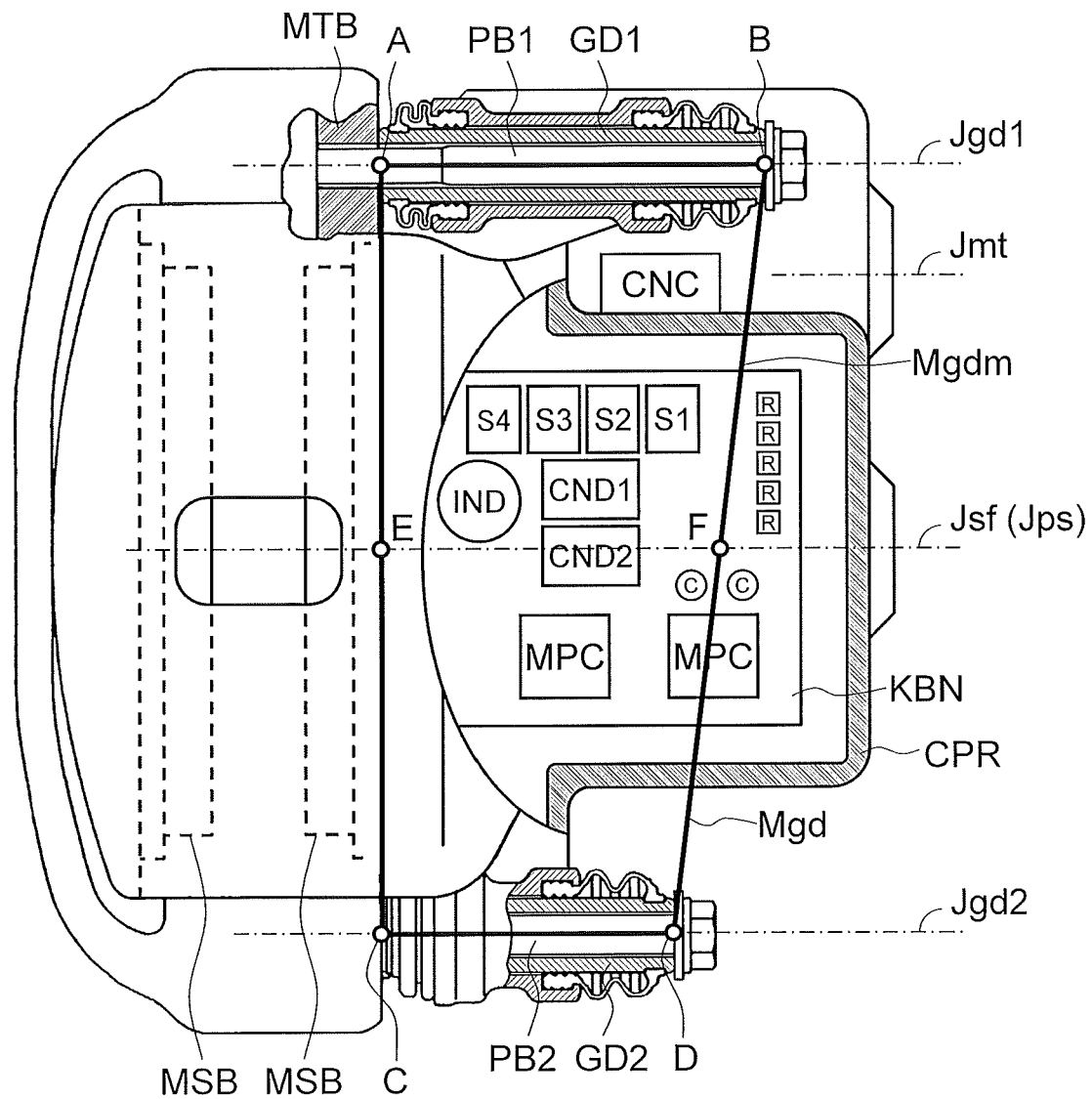
FIG. 5 is a diagram for illustrating an arrangement of electronic components in a caliper illustrated in FIG. 1.

Referring to FIG. 5, a description is now given of an arrangement of electronic components (such as the switching element S1) of the drive circuit DRV in the caliper CPR of the brake actuator BRK. In this case, DRV corresponds to the case in which the brushed motor and the π low-pass filter LPFp illustrated in FIG. 3 are employed.

The caliper CRP is mounted to the mount member (mounting bracket) MTB using the first and second guide members (slide pins) GD1 and GD2. The caliper CPR is slid (slid in an axial direction of GD1 and GD2) along the guide members GD1 and GD2. The floating caliper having this configuration is referred to as so-called "reverse type" (also referred to as "reverse pin type"). In the electric braking device, members having large mass such as the electric motor MTR are arranged on the wheel side. In the reverse type floating caliper, the members having large mass may be arranged between the guide members, thereby suppressing the vibration amplification. Further, in the reverse type floating caliper, the slide parts constructed by the guide members are not located on an outer periphery of the rotation member (disk brake) KTB, and hence the radius of the rotation member KTB may be increased, resulting in an increase in a braking effect. As a result, the overall brake actuator may be reduced in size.

The first and second guide members (slide pins, also referred to as "sleeves") GD1 and GD2 are respectively mounted to/on the mount member MTB fixed to the support member NKL using the first and second pin bolts PB1 and PB2. The caliper CPR fits to the first and second guide members GD1 and GD2 with gaps, and can be slid in the axial directions Jgd1 and Jgd2 of GD1 and GD2. Specifically, slots (an inner diameter thereof is larger than an outer diameter of GD1 and GD2) fitting to GD1 and GD2 are formed in CPR, and the first and second guide members GD1 and GD2 pass therethrough. The first and second guide members GD1 and GD2 are cylindrical sleeves, and both end portions of GD1 and GD2 are pressed against the mount member MTB and heads of the first and second pin bolts PB1 and PB2. Thus, GD1 and GD2 are fixed to the mount member MTB by tightening PB1 and PB2 in a manner of a cantilever. Thus, CPR can slide in the direction of the axis Jgd1 of GD1 and the axis Jgd2 (parallel to Jgd1) of GD2. In other words, the caliper CPR is provided/mounted to the mount member MTB by GD1 and GD2 in the slidable state.

An electronic board KBN of the drive circuit DRV is fixed inside the caliper CPR, and, on this board KBN, the switching elements S1 to S4, the first and second capacitors CND1 and CND2, the inductor IND, and other electronic components (such as a microprocessor and resistors) are mounted (fixed). When both ends of the first guide member GD1 are respectively denoted by a point A and a point B, and both ends of the second guide member GD2 are respectively denoted by a point C and a point D, a quadrangle (plane) A-B-D-C is referred to as a "guide plane (guide quadrangle) Mgd", and a space (quadrangular prism) perpendicular to the guide plane Mgd is referred to as a "guide space Kgd". In more detail, the point A is an intersection between the axis Jgd1 of the first guide member GD1 and a plane on which one end surface of GD1 is in contact with the mount member MTB. The point B is an intersection between Jgd1 and a plane on which the other end surface of GD1 is in contact with the head of the first pin bolt PB1. Similarly, the point C is an intersection between the axis Jgd2 of the second guide member GD2 and a plane on which one end surface of GD2 is in contact with the mount member MTB, and the point D is an intersection between Jgd2 and a plane on which the other end surface of GD2 is in contact with the head of the second pin bolt PB2.

The switching elements S1 to S4 construct an H bridge circuit for driving the electric motor MTR. The capacitors CND1 and CND2 and the inductor (choke coil) IND construct the stabilization circuit (the circuit for reducing the electric power fluctuation) for supplying the electric power to MTR. S1 to S4, CND1, CND2, and IND are electronic components having relatively large mass compared with other electronic components. Therefore, at least one of those electronic components is arranged in (fixed to) the guide space Kgd formed inside the caliper CPR and between the first guide member GD1 and the second guide member GD2. In other words, when projection is carried out in a direction perpendicular to the guide plane Mgd (guide quadrangle A-B-D-C formed by the end points A, B, C, and D of GD1 and GD2) (in a case of perpendicular projection in parallel projection in which the view point exists at infinity), at least one electronic component out of S1 to S4, CND1, CND2, and IND incorporated in CPR is projected onto the guide plane Mgd (that is, the guide plane Mgd is a projection plane of each electronic component in the parallel projection where the projection plane and the projection line are perpendicular to each other). In this case, "projection" means casting a parallel light beam (projection line) on an object to project a shadow thereof on a plane, and the plane is the "projection plane". Note that, the mass of the switching elements S1 to S4 may increase, particularly when the heat sinks are fixed.

The guide plane Mgd is a plane formed by the guide members (slide pins) GD1 and GD2 parallel to each other, and the caliper CPR is slid along Mgd. In terms of the road surface vibration, an intermediate part between GD1 and GD2 (that is, the guide space Kgd) is a place where the vibration (particularly, a vibration caused by a vibration in the vertical direction of the rotation axis (wheel axis) Jkt of the rotation member KTB) is unlikely to be amplified. In contrast, as the position becomes away from GD1 and GD2 toward the outside, the vibration amplification may become remarkable. Therefore, the electronic components (such as the switching elements) having relatively large mass are arranged so as to be projected onto the guide plane Mgd in the parallel projection (that is, inside the guide space Kgd). As a result, the electronic components are arranged at the place which is advantageous in terms of the road surface vibration, and thus, the reliability thereof may be secured.

Because the caliper CPR fits to the first and second guide members GD1 and GD2, and slides in the direction of the axis Jkt of KTB, the axis Jgd1 of GD1 and the axis Jgd2 of GD2 need to be parallel to each other. However, due to a machining precision and an installation precision of CPR, an error is included in the degree of parallelism between Jgd1 and Jgd2. A plane is basically defined by three points, and a main/sub relationship may thus be set in a relationship between GD1 and GD2. For example, if GD1 is set to be "main" and GD2 is set to be "sub", the main guide member GD1 is set to be longer in the axial direction than the sub guide member GD2. Moreover, a gap between GD1 and CPR (a gap between the outer diameter and the hole diameter) may be set to be narrower than a gap between GD2 and CPR. Furthermore, GD1 may be a double support structure with respect to MTB, and GD2 may be a cantilever structure with respect to MTB. CRP is basically slid along the main guide member GD1. The slide motion is assisted by the sub guide member GD2 so as to form the guide plane Mgd. In this case, on Mgd, the condition in terms of vibration becomes more advantageous as the position approaches the main guide member GD1.

If the main/sub relationship is set for the first and second guide members GD1 and GD2 (GD1 is main, and GD2 is sub), at least one of the electronic components out of S1 to S4, CND1, CND2, and IND is arranged close to the main guide member GD1. Specifically, this member (electronic component) is arranged on a side closer to the axis Jgd1 of the main guide member GD1 with respect to the axis Jsf (same as the axis Jps of the pressing member PSN) of the shaft member. In this case, a plane (quadrangle A-B-F-E) is defined as the main guide plane (main guide quadrangle) Mgdm. The main guide plane Mgdm is a part of the guide plane Mgd, which is obtained by partitioning the guide plane Mgd (dividing the guide plane Mgd into two parts) with a plane formed by the axis (wheel axis) Jkt of the rotation member KTB and the axis (shaft axis) Jsf of the shaft member SFT (that is, the axis (pressing axis) Jps of the pressing member PSN), and which is on a side closer to GD1 (side including GD1). The space (quadrangular prism) perpendicular to the main guide plane Mgdm is defined as the main guide space Kgdm.

At least one of the switching elements S1 to S4 forming the bridge circuit, and, the first and second capacitors CND1 and CND2 and the inductor (choke coil) IND forming the fluctuation reduction circuit for the supplied electric power, which are the electronic components having relatively large mass, may be arranged inside the caliper CPR and in the main guide space Kgdm. In other words, when the projection is carried out in the direction perpendicular to the guide plane Mgd (guide quadrangle A-B-D-C), at least one electronic component out of S1 to S4, CND1, CND2, and IND fixed inside CPR is projected onto the main guide plane Mgdm (main guide quadrangle A-B-F-E). In other words, the guide plane Mgd (quadrangle A-B-D-C) is partitioned (divided) into the two parts (quadrangle A-B-F-E and quadrangle E-F-D-C) by the plane formed by the shaft axis Jkt and the shaft axis Jsf (pressing axis Jps), and the main guide plane Mgdm (main guide quadrangle A-B-F-E), which is the plane including the main guide member GD1 out of the two parts, is the projection plane of the corresponding electronic components (such as S1).

On the other hand, resistors R, small capacitors C, and a microprocessor MPC, which have relatively small mass, may be arranged in the caliper CPR outside the spaces (Kgd, Kgdm) that are advantageous in terms of the vibration. On DRV included in CPR, the electronic components are prioritized in terms of the layout based on the mass of the electronic components so that the electronic components having large mass are arranged preferentially at places advantageous in terms of the vibration, and the electronic components having small mass are arranged at remaining available places. As a result, the amplification of the vibration caused by the road surface irregularities during the vehicle travel can be suppressed, and the reliability of the braking means BRK can be increased.

Similarly, in the case illustrated in FIG. 4 in which the brushless motor and the T low-pass filter LPFt are employed, the switching elements Z1 to Z6 construct the three-phase bridge circuit for driving MTR, and the capacitor CND and the first and second inductors (choke coils) IND1 and IND2 construct the stabilization circuit (electric power fluctuation suppression circuit) for supplying the electric power to MTR. Those components are electronic components having relatively large mass. Therefore, at least one of those electronic components may be arranged inside the caliper CPR and inside the guide space Kgd. In other words, when the projection is carried out in the direction perpendicular to the guide plane Mgd (guide quadrangle A-B-D-C formed by the end points of GD1 and GD2), at least one electronic component out of Z1 to Z6, CND, IND1, and IND2 fixed in CPR is projected onto the guide plane Mgd.

Moreover, if the first guide member GD1 is main and the second guide member GD2 is sub, at least one of the switching elements Z1 to Z6, the capacitor CND, and the first and second inductors (choke coils) IND1 and IND2 may be arranged at the place that is inside the caliper CPR and overlaps the guide space Kgdm. In this case, the main guide space Kgdm is a part of the guide space Kgd, which is on the side including the main guide member GD1, out of the two guide spaces obtained by partitioning with the plane formed by Jkt and Jsf (Jps). The condition for allowing GD1 to be the main guide member is that at least one of a condition that "GD1 is longer than GD2", a condition that "the gap between GD1 and CPR is narrower than the gap between GD2 and CPR", and a condition that "GD1 has a double support structure and GD2 has a cantilever structure with respect to MTB" is satisfied.

Note that, among the floating calipers, there exists a collet type floating caliper having such a structure that the guide members (slide pins) are fixed to the caliper, and slide in the mount member (mounting bracket). In this collet type caliper, the guide members are arranged at the peripheral part of the rotation member (brake disk), and thus, the guide space Kgd overlaps the rotation member MTB. Therefore, the reverse type floating caliper may be employed in which the guide members GD1 and GD2 are located on the side surface of the rotation member KTB (that is, the guide space Kgd is formed on the side surface of KTB).

<Arrangement of Connector CNC>

Figure 6:
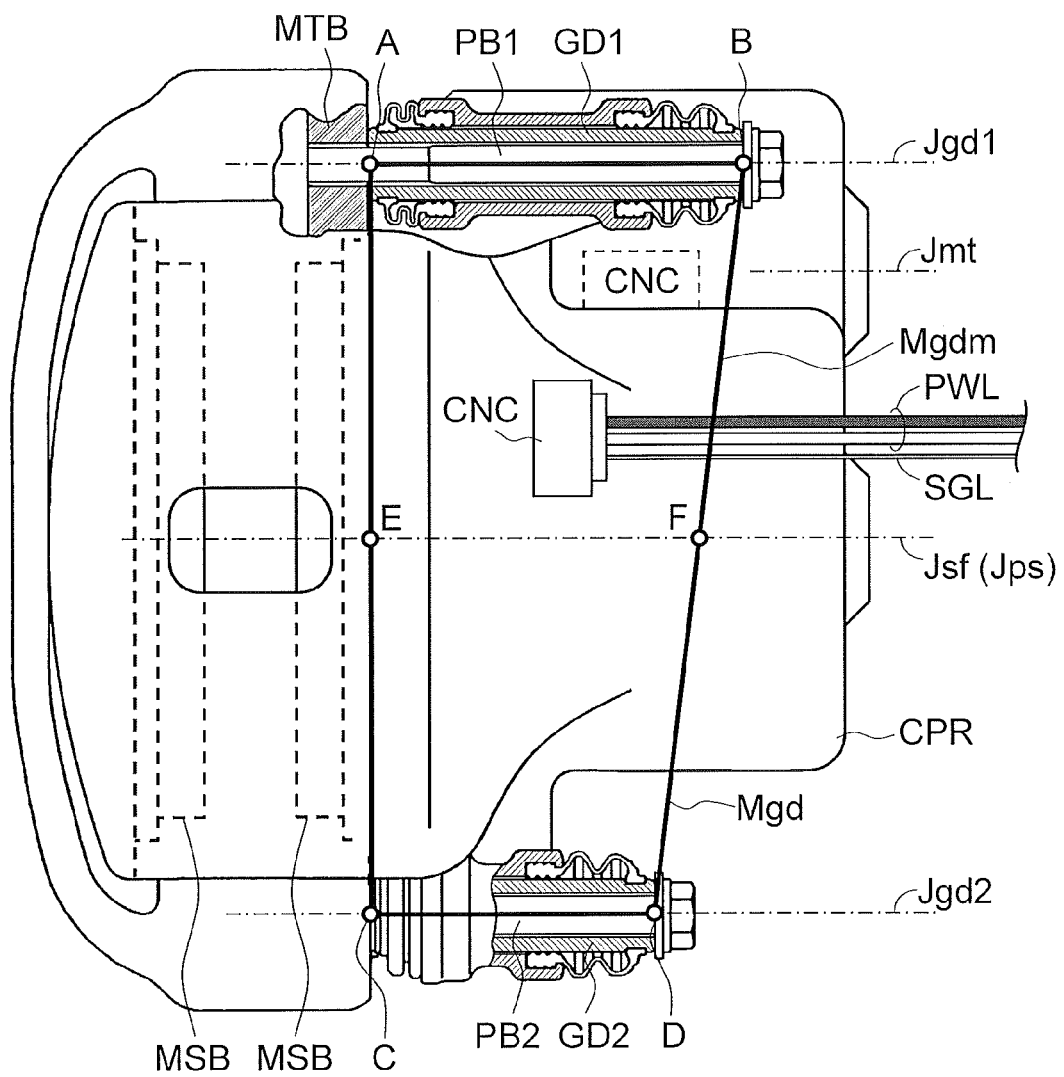
FIG. 6 is a diagram for illustrating a position of a connector to be fixed to the caliper illustrated in FIG. 1.

Referring to FIG. 6, a description is now given of an arrangement of the connector CNC. Similarly to the electronic components having relatively large mass, the connector CNC may be arranged (fixed) inside the spaces (guide spaces Kgd and Kgdm) advantageous in terms of the vibration, and on the surface of the caliper CPR. In this context, the connector is a connection device (relay member) used for connecting wires for electrical communication in an electronic circuit, communication, and the like. When the wire is soldered or crimped for the connection, the disconnection of the wiring requires the cut thereof, and the reconnection is thus difficult. However, if the connector is used for the wiring, when the disconnection of the wiring is necessary, the disconnection and connection can be easily repeated by means of the connector. The connector is constructed by fixing metal terminals (contact pins) for transmitting an electrical signal and electric power to a resin insulator enclosing the metal terminals. For the connector, a male connector in a protruded shape and a female connector in a recessed shape are used as a pair.

The drive signal and the electric power for the electric motor are transmitted to the drive means DRV for the electric motor through the plurality of electric power supply lines PWL twisted together and the signal line SGL, and the connector CNC. Specifically, the circuit board of the electronic control unit ECU fixed to the vehicle body and the circuit board KBN for DRV fixed to CPR are electrically and electronically connected to each other via the connector CNC. The drive signal Imt for the electric motor is generated inside ECU, and is transmitted to DRV via the signal line (such as a communication bus line) SGL. The electric power for driving the electric motor is supplied from the storage battery BAT to the electronic control unit ECU, and is supplied from the ECU to the drive circuit DRV via the electric power line PWL.

In the connector CNC, particularly the mating part (part at which the female side connector and the male side connector are mated to each other) and joint parts between the wires (electric power lines PWL and signal line SGL) and contact pins tend to receive the influence of the vibration. Therefore, the connector CNC may be arranged on the surface of the caliper CPR and in the guide space Kgd. In other words, when the projection is carried out in the direction perpendicular to the guide plane Mgd (guide quadrangle A-B-D-C formed by the end points of the first and second guide members GD1 and GD2), the connector CNC fixed on the surface of the caliper CPR is projected onto the guide plane Mgd.

Moreover, if the first guide member GD1 is main and the second guide member GD2 is sub, the connector CNC may be arranged at a place that is on the surface of the caliper CPR and overlaps the main guide space Kgdm. In this case, the main guide space Kgdm is a part of the guide space Kgd, which is on the side including the main guide member GD1, out of the two guide spaces obtained by partitioning with the plane formed by Jkt and Jsf (Jps). The condition for allowing GD1 to be the main guide member is that at least one of a condition that "GD1 is longer than GD2", a condition that "the gap between GD1 and CPR is narrower than the gap between GD2 and CPR", and a condition that "GD1 has a double support structure and GD2 has a cantilever structure with respect to MTB" is satisfied.

In the connector CNC, the current supply in the wires is carried out through the contacts between the contact pins (mating between the male pin and the female pin), and the contacts may be loosened by the vibration. Further, the electric power lines PWL for supplying the electric power require a cross sectional area for the flow of the current, and thus require a wire which is thick to some degree. Therefore, a bending fatigue generated by a bending caused by the vibration needs to be considered. As described above, the connector CNC is fixed to a position (for example, in Kgd) that is advantageous in terms of the vibration on the surface of the caliper CPR. Therefore, the influence of the vibration on the contacts between the contact pins may be suppressed, and the bending of the wires (particularly, electric power lines PWL requiring thickness) may also be suppressed.

In this case, power line communication in which the electric power line PWL is used also as the signal line SGL may be employed. In the power line communication, the drive signal Imt for the electric motor is superimposed on the electric power line PWL to be transmitted. In this case, the signal line SGL is omitted, and the wires are only the electric power lines PWL. The wires (PWL) are pulled into DRV in CPR via CNC surface.

<Position Relationship among Guide Members, Shaft Axis Jsf (Pressing Axis Jps), and Motor Axis Jmt>

Figure 7:
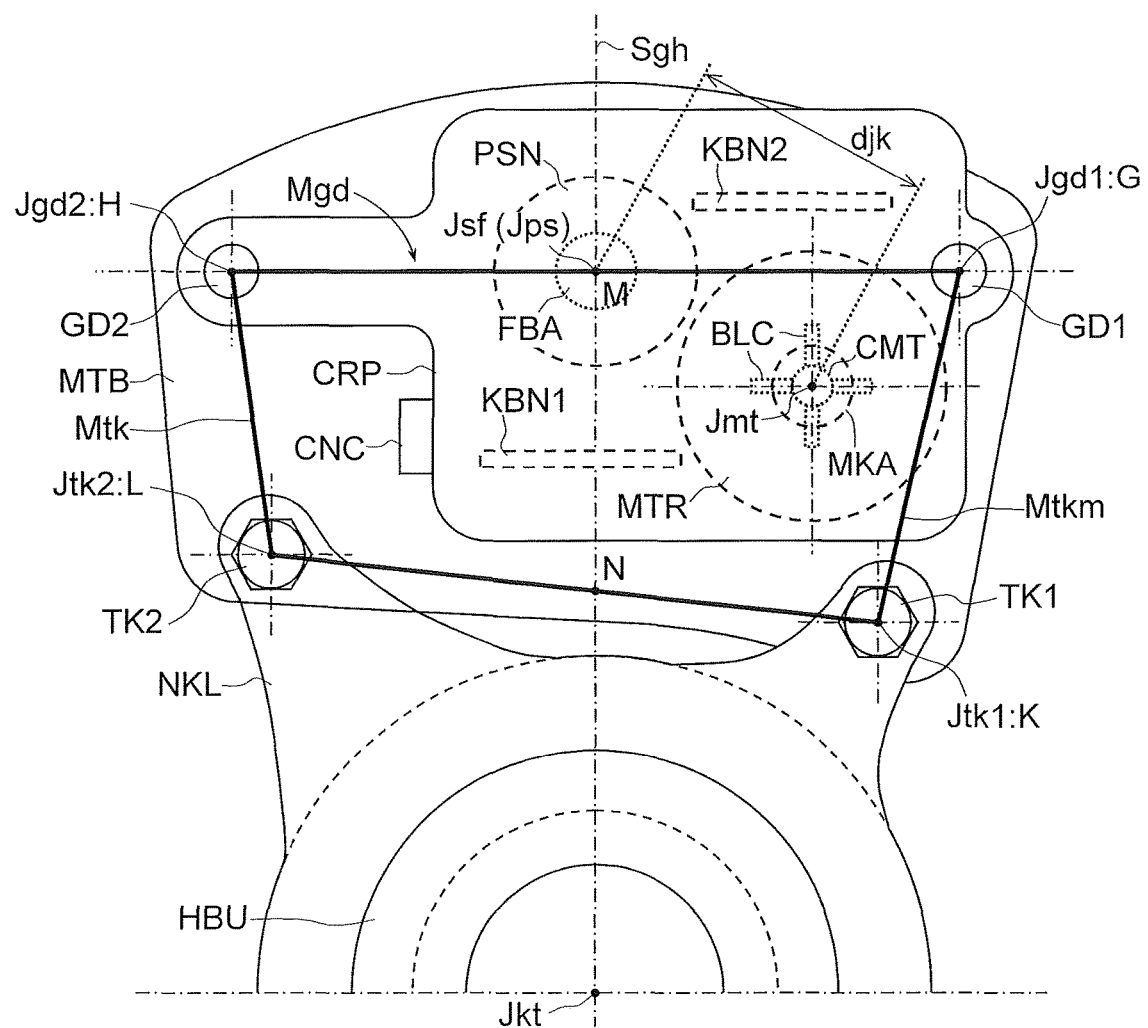
FIG. 7 is a diagram for illustrating a position relationship of respective axes of a brake disk, a main slide pin, a sub slide pin, and a piston, and the electric motor.

The arrangement of the electronic components (such as S1) having relatively large mass and the connector CNC has been described. Referring to FIG. 7, a description is now given of the arrangement of the electric motor MTR and the pressing member PSN (that is, a geometrical relationship among the guide axes Jgd1 and Jgd2, the shaft axis Jsf (pressing axis Jps), and the motor axis Jmt). FIG. 7 is an illustration of a state of the first and second guide members (slide pins) GD1 and GD2, and the caliper CPR, the mount member MTB, and the support member NKL mounted by the first and second fastening members (such as bolts) TK1 and TK2, and the hub bearing unit HBU, as viewed in the direction of the rotation axis Jkt of the rotation member KTB. A point G corresponds to the axis (first guide axis) Jgd1 of the first guide member GD1, and a point H corresponds to the axis (second guide axis) Jgd2 of the second guide member GD2. A point K corresponds to the axis (first fastening axis) Jtk1 of the first fastening member (first fastening bolt) TK1, and a point L corresponds to the axis (second fastening axis) Jtk2 of the second fastening member (second fastening bolt) TK2. A straight line H-G connecting between Jgd1 (point H) and Jgd2 (point G) corresponds to the guide plane Mgd.

The caliper CPR is mounted by the mount member MTB in the slidable state. The influence of the vibration excited by the wheel becomes large as the position becomes away from MTB in the wheel axis Jkt direction. Therefore, a one-axis configuration of arranging the electric motor, the speed reducer, the rotation/translation conversion member, and the brake piston in a single line causes extension of the length along the single line in the axial direction, and is not thus employed. In order to reduce the size in the axial direction, a two-axis configuration in which the electric motor MTR and the pressing member PSN have the two different axes (motor axis Jmt and pressing axis Jps) is employed. In this case, the axis may be divided into the two axes Jmt and Jsf (Jps) at the location of the speed reducer GSK. The braking means BRK has the two different axes (Jmt and Jsf), and the part of the speed reducer GSK is provided between the axes (between Jmt and Jsf). Thus, the inter-axial distance djk (distance between Jmt and Jsf) may be set to be long. As a result, the speed reduction ratio of the speed reducer GSK may be set to be large, and a small electric motor (high speed/low torque type) may be employed.

The mount member MTB is fixed to the support member (knuckle) NKL by the first fastening member (first fastening bolt) TK1 and the second fastening member (second fastening bolt) TK2. As a result, the area (space) surrounded by the guide members GD1 and GD2 and the fastening members TK1 and TK2 is an area in which the vibration (particularly, the vibration in the direction of the rotation axis Jkt of the rotation member KTB) is most unlikely to be amplified when the vehicle travels on an uneven road. In other words, when the parallel projection in the direction of Jkt is carried out, the plane (referred to as a "fastening plane Mtk") formed to be perpendicular to each of the axis Jgd1 of the first guide member GD1, the axis Jgd2 of the second guide member GD2, the axis Jtk1 of the first fastening member TK1, and the axis Jtk2 of the second fastening member TK2 is a place that is advantageous in terms of the road surface vibration. When viewed in the direction of the rotation axis Jkt of the rotation member KTB, the inside of the fastening plane Mtk (fastening quadrangle G-H-L-K) is the area (space) in which the vibration is unlikely to be amplified.

Note that, Jkt, Jgd1, Jgd2, Jtk1, and Jtk2 are parallel to one another.

The axis Jps (that is, the axis Jsf of the shaft member SFT) of the pressing member PSN is arranged at the center of the plane (that is, Mgd) connecting the axis Jgd1 of GD1 and the axis Jgd2 of GD2 to each other. The axis Jps (that is, the axis Jsf of SFT) of PSN is arranged at the center of Jgd1 and Jgd2, and MSB may thus be evenly pressed against KTB. The electric motor MTR is fixed to CPR so that the rotation axis (motor axis) Jmt of the electric motor MTR is orthogonal to the fastening plane Mtk. Thus, if MTR is a brushless motor, the brushes BLC and the commutator CMT constructing the electric motor MTR are projected onto the fastening plane Mtk when viewed in the direction of Jkt. Moreover, the position acquisition means (rotational angle detection means) MKA is arranged around the motor axis Jmt. Thus, the position acquisition means MKA is projected onto the fastening plane Mtk when viewed in the direction of Jkt.

The brushes BLC of the electric motor MTR slidably rotate (refer to FIG. 3) while being pressed against the commutator (rotation switch for periodically switching the direction of the current) CMT by springs. When spring forces are increased (springs having a large spring constant are used) so that the brushes BLC are not separated from the commutator CMT by the vibration, slide resistances may be increased, resulting in an increase in the torque loss. Therefore, the positions of BLC and CMT are set in a place where the vibration is unlikely to be amplified. A decrease in reliability and influence of noise caused by the road surface vibration during the vehicle travel may become a concern, and hence the MKA may also be installed at a position where the vibration is unlikely to be amplified.

Position relationships among the respective axes are now summarized. First, the shaft axis (axis of SFT) Jsf, the pressing axis (axis of PSN) Jps, the motor axis (axis of MTR) Jmt, the wheel axis (axis of WHL; axis of rotation member KTB) Jkt, the first guide axis (axis of first guide member GD1) Jgd1, the second guide axis (axis of second guide member GD2) Jgd2, the first fastening axis (axis of first fastening member TK1) Jtk1, and the second fastening axis (axis of second fastening member TK2) Jtk2 are parallel to one another. Moreover, the shaft axis Jsf and the pressing axis Jps are coaxial with each other. Jgd1, Jgd2, and Jsf (Jps) are on the same plane (guide plane Mgd), and the distance between Jgd1 and Jsf (Jps) and the distance between Jgd2 and Jsf (Jps) are equal to each other. In other words, Jsf (Jps) is at the center between Jgd1 and Jgd2.

The rotation axis (motor axis) Jmt of the electric motor is orthogonal to the fastening plane Mtk (or is included in the space perpendicular to the quadrangle G-H-L-K), and is arranged at a position closer to Jkt than Jsf (Jps) (that is, on the side of Jkt with respect to the guide plane Mgd). Moreover, Jmt is arranged so as to be separated from Jgd1 (or Jgd2) by at least a distance corresponding to a radius of MTR. The distance (inter-axis distance djk) between Jsf (Jps) and Jmt may be set as long as possible so as not to interfere with the pressing member PSN and the first guide member GD1. As a result, regarding the power transmission from MTR to SFT, the speed reduction ratio of the speed reducer GSK is set to be large, and the size of MTR may thus be reduced.

When viewed in the direction of the first guide axis Jgd1 (such as the direction of Jkt), a circuit board KBN1 for the drive means DRV is projected onto the fastening plane Mtk.

Similarly, when viewed in the direction of Jgd1, at least one of the electronic components (the switching elements S1 to S4 and Z1 to Z6, and the capacitors CND, CND1, and CND2 and the inductors IND, IND1, and IND2 in the voltage fluctuation reduction circuit) mounted on the circuit board KBN1 of the drive circuit DRV is projected onto the fastening plane Mtk. Further, when viewed in the direction of Jgd1, the connector CNC is projected onto Mtk.

Such an arrangement is made that, when viewed from the first guide axis Jgd1 direction (that is, the direction of Jkt or the like), the rotation axis Jmt of MTR is in a space (quadrangular prism, referred to as a "fastening plane Ktk") projected onto the fastening plane Mtk. The two-axis configuration reduces the overall size of the brake actuator in the axial direction, and approximately the entire MTR (particularly, the motor brushes BLC and the motor commutator CMT) and the rotational angle acquisition means MKA are arranged inside the fastening space Ktk. As a result, the vibration influence from the road surface on those components may be suppressed. Moreover, the electronic components (such as IND) having large mass and the connector CNC are also arranged/stored in the fastening space Ktk, and hence the vibration influence may be reduced, to thereby improve the reliability.

Further, if the above described main/sub relationship (configuration formed by the main guide member GD1 and the sun guide member GD2) exists between the first guide member GD1 and the second guide member GD2, when viewed from the direction of Jgd1 (direction of Jkt), the components (such as BLC, CMT, MKA, CNC, S1, IND, and CND) may be projected onto a fastening plane Mtkm on the side of the main guide member GD1. Specifically, the fastening plane Mtk is partitioned (divided into two parts) by the plane (plane including a straight line Sgh crossing Jsf (Jps) and Jkt on Mtk) formed by Jsf (that is, Jps) and Jkt, and the main fastening plane Mtkm is the part on one side of the partitioned Mtk, and is a plane (quadrangle G-M-N-K partitioned by the line Sgh) including the main guide axis Jgd1 (axis of the main guide member GD1). A set (quadrangular prism) of lines perpendicular to this plane (main fastening plane) Mtkm is referred to as a "main fastening space Ktkm". The motor axis Jmt is arranged inside the main fastening plane Ktkm, and the motor brushes BLC, the motor commutator CMT, and the position acquisition means MKA may thus also be arranged inside Ktkm. Moreover, at least one of the switching elements (for example, S1 to S4) for driving MTR and the inductors (coils) IND and the capacitors CND for suppressing the voltage fluctuation is arranged inside the main fastening plane Ktkm. The connector of the wires for supplying the drive signal and the electric power from the electronic control unit ECU to the drive circuit DRV may be arranged in the main fastening plane Ktkm.

If the two guide members (slide pins) are different in the length from each other, and the main/sub relationship is thus set, as the position approaches the main guide member GD1, the vibration influence decreases. Thus, the above-mentioned components are arranged inside the main fastening space Ktkm on the side of the main guide member GD1 (that is, when viewed from the direction of Jgd1, those components are projected onto Mtkm), and the influence of the road surface vibration during the vehicle travel may thus be reduced.

Note that, there is a restriction of the place when all the components are to be arranged in the fastening space Ktk. The inter-axis distance djk between the pressing axis (axis of the piston PSN) Jps and the motor axis Jmt is maximally secured, the size of the brake actuator BRK is reduced, and thus, the arrangement of Jmt in the fastening space Ktk (or the main fastening space Ktkm) may be prioritized. In this case, a circuit board KBN2 for the drive circuit DRV may be arranged outside the fastening space Ktk, and on a side opposite to the wheel axis Jkt with respect to the guide plane Mgd. However, the electronic board KBN2 may be arranged on a side closer to the main guide member GD1 with respect to the plane (indicated by the line Sgh) formed by Jkt and Jps (Jsf). KBN2 may be arranged at a place between Jps (Jsf) and Jgd1. In this case, the electronic component (at least one of the capacitors CND, CND1, and CND2 and the inductors IND, IND1, and IND2 in the noise reduction circuit, and the switching elements S1 to S4 and Z1 to Z6, which have relatively large mass) mounted on KBN2 is arranged on the side closer to GD1 (inside the main guide space Kgdm). Moreover, the connector CNC is arranged inside the fastening space Ktk on the side opposite to the main fastening space Ktkm.

Moreover, the motor axis Jmt may be arranged inside the fastening space Ktk (Ktk on the side including GD2 partitioned by the plane formed by Jkt and Jps) on the side opposite to the main fastening space Ktkm, and at least one of the capacitors CND, CND1, and CND2 and the inductors IND, IND1, and IND2 in the noise reduction circuit, the switching elements S1 to S4 and Z1 to Z6, and the connector CNC may be arranged inside the main fastening space Ktkm. The arrangement of the respective components is determined by the priority based on the vibration influence thereon.

<Arrangements of Pressing Force Acquisition Means, Position Acquisition Means, and Motor Brushes>

Figure 8:
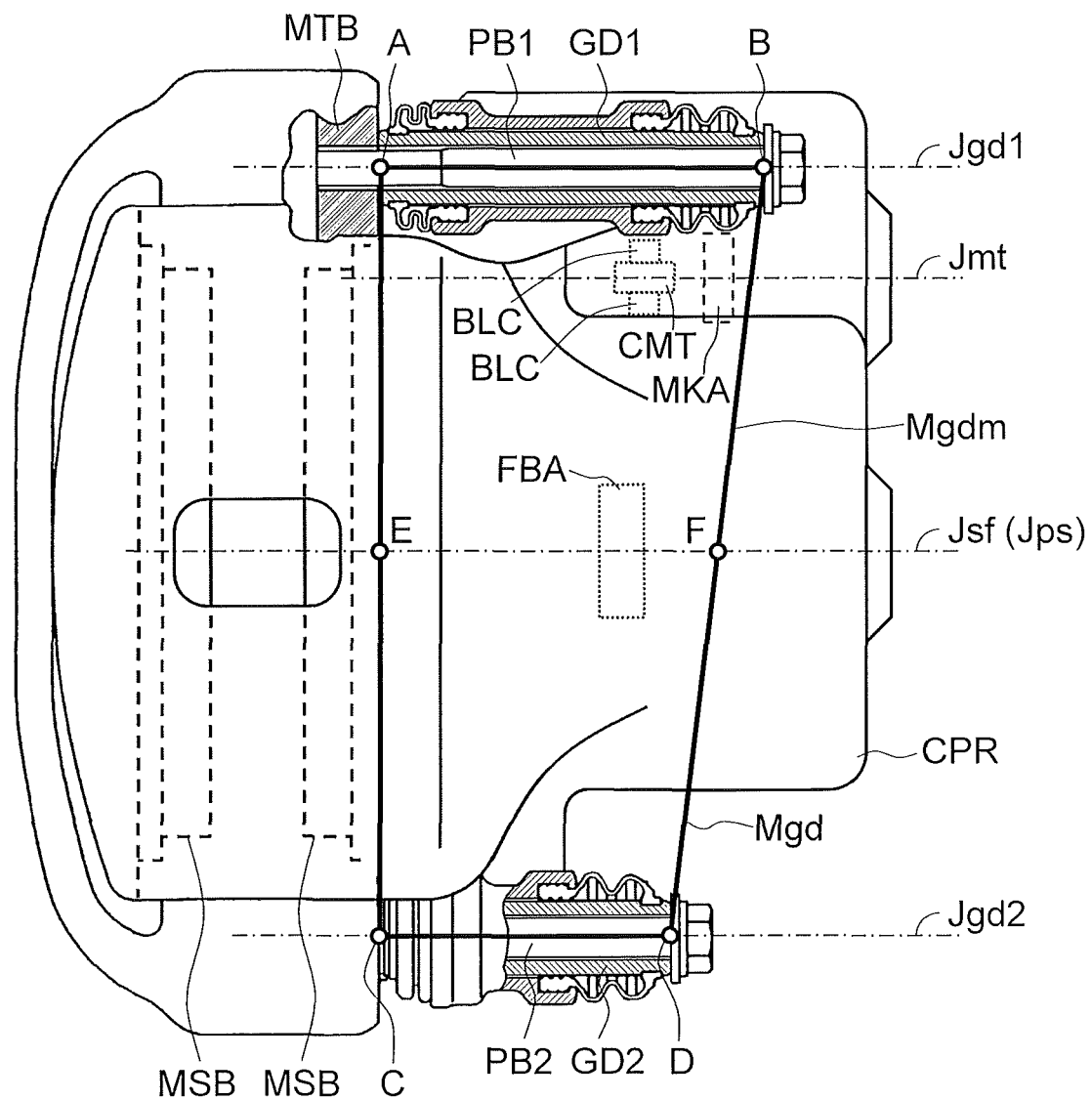
FIG. 8 is a diagram for illustrating positions of sensors and the like in the caliper illustrated in FIG. 1.

Referring to FIG. 8, a description is now given of arrangements of the pressing force acquisition means FBA, the position acquisition means MKA, and the motor brushes BLC. Those components are, similarly to the above-mentioned electronic components, arranged (fixed) inside the space (Kgd and Kgdm) that is advantageous in terms of the vibration, and inside the caliper CPR.

A sensor (detection means) may include elements vulnerable to vibrations, and a noise influence caused by the vibration may also be concerned. Therefore, when viewed in the direction perpendicular to the guide plane Mgd, FBA and/or MKA is projected onto the guide plane Mgd (particularly, on the guide plane Mgdm on the main guide member GD1 side if the main/sub relationship exists in the guide members). In other words, the positions of FBA and MKA may be set inside the guide space Kgd (or the main guide space Kgdm). Those are arranged at the place (space) that is advantageous in terms of the vibration, and the potential problem caused by the road surface vibration during the vehicle travel may thus be solved.

Moreover, if the brushed motor is used as the electric motor MTR, the motor brushes BLC and the motor commutator CMT are arranged inside the guide space Kgd (or the main guide space Kgdm), and places thereof are projected onto the guide plane Mgd (or the main guide plane Mgdm). In the case of the brushed motor, the motor brushes BLC slide while being pressed against the commutator CMT by the springs (elastic bodies). In order to maintain the contact state between BLC and CMT against the vibration, the spring constants need to be set to be large. An appropriate arrangement of BLC and CMT may suppress the increase in the spring constants, thereby preventing the slide friction from increasing.

<Functions/Effects>

Figure 9:
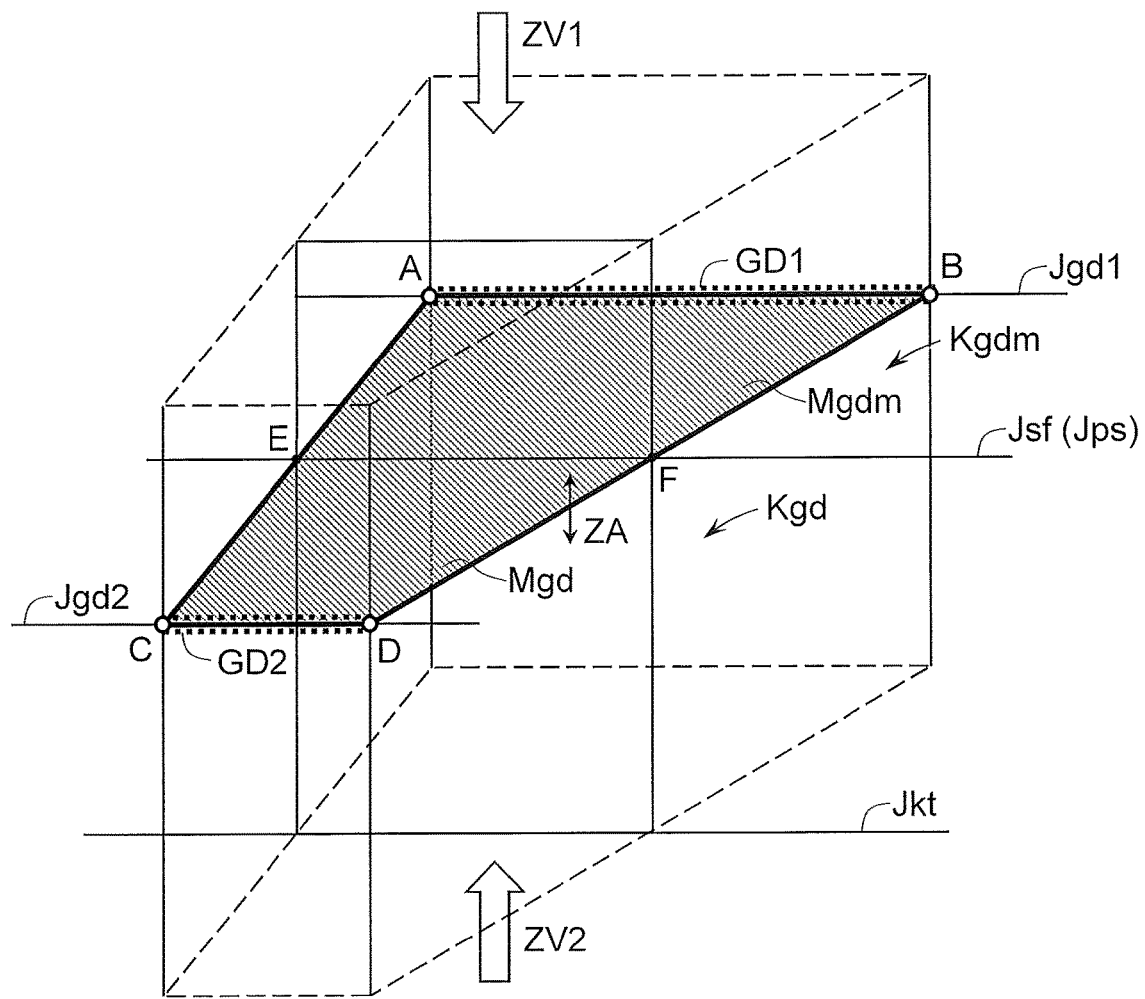
FIG. 9 is a diagram for illustrating a guide plane formed by guide members (main slide pin and sub slide pin).
Figure 10:
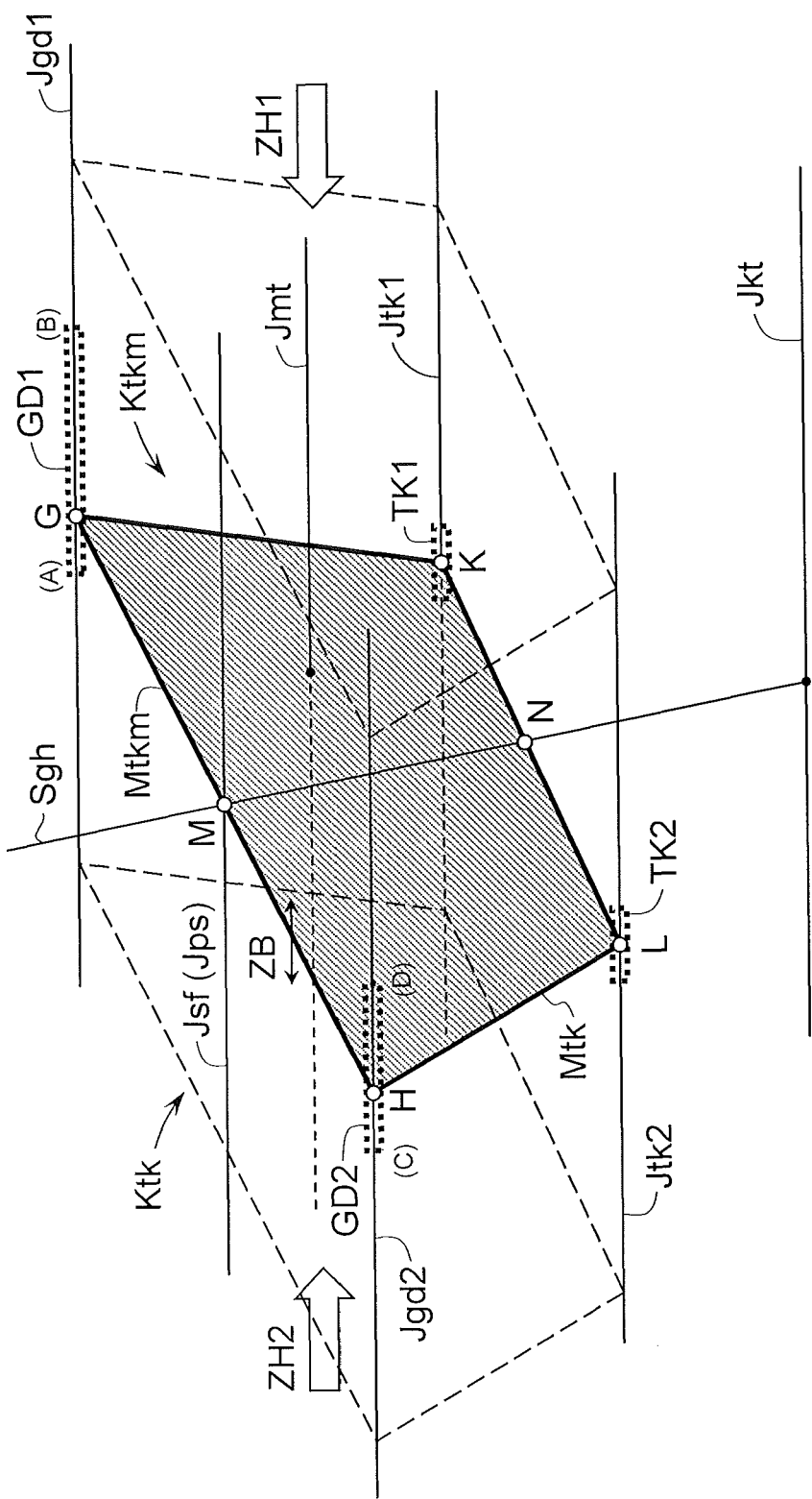
FIG. 10 is a diagram for illustrating a fastening plane formed by the guide members (main slide pin and sub slide pin) and fastening members (first bolt and second bolt).
Figure 11:
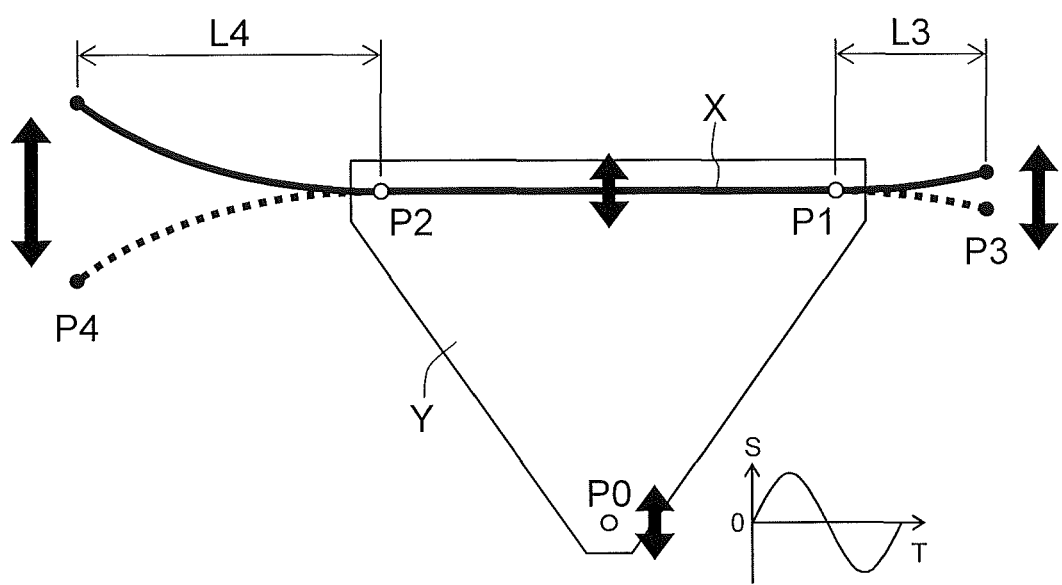
FIG. 11 is a diagram for illustrating a problem relating to a vibration caused by road surface irregularities during vehicle travel.

Referring to FIG. 9 and FIG. 10, a description is now given of functions and effects of the embodiment of the present invention.

The braking means BRK has the so-called two-axis configuration in which the rotation axis Jmt of the electric motor MTR, which is a power source, and the axis (pressing axis Jps) of PSN for pressing MSB are different axes. The rotational power of MTR is reduced in speed to be transmitted to SFT, then the rotation/translation conversion is carried out by NJB, and thus, PSN presses MSB against KTB. Therefore, the axis Jps of PSN and the rotation axis Jsf of SFT are the same axis.

The electric motor MTR is fixed to the floating caliper CPR. The drive circuit DRV for driving MTR is included in (fixed inside) CPR. The bridge circuit for driving MTR is formed by the switching elements in the drive circuit DRV. Moreover, the low-pass filter circuit for stabilizing (reducing the fluctuation of) the electric power supplied to MTR is constructed by the inductors and the capacitors in the drive circuit DRV. The power to the drive circuit DRV and the drive signal to the electric motor MTR are supplied from the electronic control unit ECU fixed to the vehicle body via the connector CNC.

The position acquisition means (for example, a rotational angle sensor) MKA is provided around the rotation axis (Jmt) of the electric motor MTR. MKA detects the actual position (rotational angle) Mka of the electric motor MTR. When MTR is the brushless motor, the switching elements are synchronized based on Mka, thereby driving MTR. On the other hand, when MTR is the brushed motor, the mechanical commutator CMT and the brushes BLC are provided. Around the shaft axis Jsf (coaxial with the pressing axis Jps), the pressing force acquisition means (for example, a thrust sensor) FBA is provided for detecting the pressing force Fba, which is the force of the friction members MSB pressing the rotation member KTB.

FIG. 9 is an illustration of the guide plane Mgd (guide quadrangle A-B-D-C) formed by the first and second guide members GD1 and GD2, and the guide space Kgd perpendicular to this plane. In this case, the respective points at the four corners of the quadrangle A-B-D-C (guide plane Mgd) are the both ends (point A and point B) of the first guide member GD1, and the both ends (point C and point D) of the second guide member GD2, respectively. Specifically, the point A is the intersection between the plane on which the one end surface of GD1 is in contact with the mount member MTB and the axis (first guide axis) Jgd1 of the first guide member GD1, and the point B is the intersection between the plane on which the other end surface of GD1 is in contact with the head of the first pin bolt PB1 and the first guide axis Jgd1. Similarly, the point C is the intersection between the plane on which the one end surface of GD2 is in contact with the mount member MTB and the axis (second guide axis) Jgd2 of the second guide member GD2, and the point D is the intersection between the plane on which the other end surface of GD2 is in contact with the head of the second pin bolt PB2 and the second guide axis Jgd2. CPR is mounted to MTB by GD1 and GD2, and as the position approaches Mgd, the influence of the vibration caused by the road surface irregularities during the vehicle travel is more unlikely to be received. Note that the road surface vibration is input in a random direction (arbitrary direction), however, the influence of the vibration in the direction indicated by "arrow ZA" (direction perpendicular to the wheel axis Jkt) is particularly problematic.

The place where the vibration influence (particularly, the ZA direction perpendicular to Jkt) from the road surface during the vehicle travel may be suppressed is the guide space Kgd. The components of BRK for which an anti-vibration property is required are provided in Kgd. Kgd is the set of the straight lines perpendicular to Mgd, and those components are thus projected onto Mgd when viewed in the direction perpendicular to Mgd. In this case, the projection means casting a parallel light beam (projection line) on an object, and projecting the shadow of the object on a plane. Thus, when the parallel projection (projection in which the view point exists at infinity) is carried out for the components provided in Kgd, the guide plane Mgd is set to the projection plane (plane perpendicular to the projection line).

In the following, the components of BRK that may be arranged inside the guide space Kgd are listed. In this context, "arranged inside the guide space Kgd (or Kgdm)" is equivalent to "positioned inside the guide plane Mgd (or Mgdm)" and "the guide plane Mgd (or Mgdm) is the projection plane" when viewed in the direction (ZV1 or ZV2) perpendicular to the guide plane Mgd (or Mgdm).

The component that requires the anti-vibration property is a component having relatively large weight among the electronic components mounted (fixed) to the circuit board KBN of DRV fixed inside CPR. Specifically, the component includes the switching elements (particularly, having large weight when the heat sink is installed) in the drive bridge circuit for MTR, and the inductors and the capacitors in the electric power supply noise reduction circuit. For the same acceleration, the inertia is large for large mass. Further, the electronic component is fixed at conductors (leads) to the circuit board, and the inertial force is concentrated at this part. Thus, the anti-vibration property may be improved by arranging at least one of the electronic components, which are fixed inside CPR, inside Kgd.

In addition, the component requiring high anti-vibration property is the connector CNC fixed to the surface of CPR. The electric power is supplied from the electronic control unit ECU to the drive circuit DRV for the electric motor MTR via the electric power line PWL, and the drive signal is transmitted from the electronic control unit ECU to the drive circuit DRV via the signal line SGL (such as a communication bus). PWL and SGL are relayed by the connector CNC. Specifically, PWL and SGL are disconnected, and are joined inside CNC by the contact pins (the mating of the recessed and protruded pins). When an excessive vibration is applied, the contact pins may be loosened. Further, the large current is supplied through the electric power line PWL, and thus a predetermined cross sectional area is required, but the flexibility and the fatigue strength against the vibration are required. Those problems are solved by arranging the connector CNC fixed on the caliper CPR inside the guide space Kgd, and the anti-vibration property may thus be improved.

The detection means such as sensors receive influence of noises and the like, and the anti-vibration property is thus required for the detection means. Therefore, at least one of the position acquisition means MKA and the pressing force acquisition means FBA may be arranged inside the guide space Kgd. When the brushed motor is used as the electric motor MTR, the brush BLC part and the commuter CMT part of the electric motor MTR may be arranged inside the guide space Kgd. This is because BLC are pressed against CMT by the springs, and the current supply to MTR is thus secured.

Further, if the main/sub relationship is set for the guide members GD1 and GD2 (in a case of the main guide member GD1 and the sub guide member GD2), at least one of the listed components is arranged in the guide space (main guide space) Kgdm on the side closer to the main member GD1. The "main/sub relationship" between the guide members means the state in which at least one of the conditions, that is, a condition that "the one is longer than the other", a condition that "the gap of the one is narrower than the gap of the other in the mating hole to CPR", and a condition that "the one has the double support structure and the other has the cantilever structure" is satisfied. Kgd is divided into the two spaces by the plane formed by Jkt and Jsf, and the space including GD1 (the guide member on the one side) out of those spaces is defined to be to the main guide space Kgdm. In other words, on Mgd, Kgdm is the space formed by a set of the straight lines perpendicular to the main guide plane Mgdm (main guide quadrangle A-B-F-E) partitioned by Jsf and including GD1. CRP is slid along the main guide member GD1, and the slide motion is assisted by the sub guide member GD2. In this case, as the position approaches the main guide member GD1, the position is more advantageous in terms of the vibration, and the components for which the anti-vibration property is required are arranged in Kgdm, and the projection plane thereof is Mgdm.

FIG. 10 is a diagram for illustrating the fastening plane Mtk (fastening quadrangle G-H-L-K) formed by the fastening members TK1 and TK2 and the guide members GD1 and GD2, and the fastening space Ktk perpendicular to this plane. The fastening plane Mtk is the plane (quadrangle G-H-L-K) formed to be perpendicular to each of the axis Jgd1 of the first guide member GD1, the axis Jgd2 of the second guide member GD2, the axis Jtk1 of the first fastening member TK1, and the axis Jtk2 of the second fastening member TK2. When a plane (for example, the surface of the mount member MTB) perpendicular to the rotation axis (wheel axis) Jkt of the rotation member KTB is assumed, regarding the respective points at the four corners of the quadrangle G-H-L-K, the intersection between the axis (first guide axis) Jgd1 of the first guide member GD1 and the assumed plane corresponds to the point G, the intersection between the axis (second guide axis) Jgd2 of the second guide member GD2 and the assumed plane corresponds to the point H, the intersection between the axis (first fastening axis) Jtk1 of the first fastening member (first fastening bolt) TK1 and the assumed plane corresponds to the point K, and the intersection between the axis (second fastening axis) Jtk2 of the second fastening member (second fastening bolt) TK2 and the assumed plane corresponds to the point L. In this case, the rotation axis Jkt of KTB, the axes Jgd1 and Jgd2 of the guide members, Jtk1 and Jtk2 of the fastening members, the rotation axis Jmt of the electric motor, and the rotation axis Jsf of the shaft member are respectively parallel to one another. Moreover, the axis (pressing direction) Jps of the pressing member is the same as Jsf. Thus, those axes (such as Jkt) and the fastening plane Mtk are perpendicular to each other. Note that, the straight line H-G connecting between Jgd1 (point H) and Jgd2 (point G) corresponds to the guide plane Mgd.

The mount member MTB is mounted to the support member (knuckle) NKL by the fastening members TK1 and TK2, and the caliper CPR is mounted to the mount member MTB by the guide members GD1 and GD2. Therefore, as the position approaches the fastening plane Mtk, the influence of the road surface vibration is more unlikely to be received. The road surface vibration during the vehicle travel is input in a random direction (arbitrary direction), however, the influence of the vibration in the direction indicated by "arrow ZB" (direction of the wheel axis Jkt) is particularly problematic.

The place where the vibration influence (particularly, in the ZB direction parallel to Jkt) from the road surface during the vehicle travel may be suppressed is the fastening space Ktk. Jps is arranged at the center between Jgd1 and Jgd2 so that MSB may be pressed at the center by PSN. Jps and Jsf are the same axis, and Jsf is thus provided at the center between Jgd1 and Jgd2. Then, MTR is arranged inside Mtk so as not to interfere with the guide member GD1 or GD2. In other words, Jmt is provided inside Ktk.

Similarly to the case of the guide space Kgd, the components of the braking means BRK for which the anti-vibration property is required are provided inside the fastening space Ktk. The fastening space Ktk is the set of the straight lines perpendicular to the fastening plane Mtk, and those components are thus projected onto the fastening plane Mtk when viewed in the direction perpendicular to the fastening plane Mtk (for example, in the direction of Jgd1). As described above, the projection means casting the parallel light beam (projection line) on an object, and projecting the shadow of the object on the plane. Thus, when the parallel projection (projection in which the view point exists at infinity) is carried out for the components provided in the fastening space Ktk, the fastening plane Mtk is set to the projection plane (plane perpendicular to the projection line). In other words, "arranged inside the fastening space Ktk (or Ktkm)" is equivalent to "positioned inside the fastening plane Mtk (or Mtkm)" and "the fastening plane Mtk (or Mtkm) is the projection plane" when viewed in the direction (ZH1 or ZH2) of the axis Jgd1 of the first guide member GD1.

For the same reason as in the above-mentioned case of the guide space Kgd, the components (components for which the anti-vibration requirement is high) of the braking means BRK may be arranged inside the fastening space Ktk. Among the electronic components fixed inside the caliper CPR, at least one of the components (the switching elements in the drive bridge circuit for MTR, and the inductors and the capacitors in the electric power supply noise reduction circuit) having relatively large weight is arranged inside the fastening space Ktk. The connector CNC fixed on the caliper CPR may be arranged inside the fastening space Ktk. Among the detection means such as sensors, at least one of the position acquisition means MKA and the pressing force acquisition means FBA may be arranged inside the fastening space Ktk. When the brushed motor is used as the electric motor MTR, the BLC part and the CMT part of MTR may be arranged inside Ktk.

Further, as described above, if the main/sub relationship is set for the guide members GD1 and GD2 (in case of the main guide member GD1 and the sub guide member GD2), at least one of the components is arranged in the fastening space (main fastening space) Ktkm on the side closer to the main member GD1. Similarly to Kgd, Ktk is divided into the two spaces by the plane formed by Jkt and Jsf (Jps), and the space including the main guide member GD1 out of those spaces is defined as the main fastening space Ktkm. In other words, the main fastening space Ktkm is the space that is formed by the set of the straight lines perpendicular to the main fastening plane Mtkm (main fastening quadrangle G-M-N-K) that is obtained by being partitioned by the plane formed by Jsf (Jps) and Jkt and that includes the main guide member GD1 in the fastening plane Mtk. The components for which the anti-vibration property is required are arranged in the main fastening space Ktkm, and the projection plane thereof may be the main fastening plane Mtkm.

When the vehicle is traveling, the road surface vibration input from the wheel side acts in an arbitrary direction. As described above, in the caliper CPR, the place (space) at which the vibration effect is minimum while the vehicle is traveling on an uneven road is inside the guide space Kgd and inside the fastening space Ktk. Further, if the guide members have the main/sub relationship, the place is inside the main guide space Kgdm and inside the main fastening space Ktkm. The area (place) satisfying this condition is limited, and hence the components are arranged sequentially on the priority basis. However, when at least one of the arrangement conditions described above is satisfied, the potential problem caused by the vibration influence may be greatly eliminated.

Moreover, according to the embodiment of the present invention, the axis (Jsf) of the shaft member (SFT) is arranged at the center between the axis (Jgd1) of the first guide member (GD1) and the axis (Jgd2) of the second guide member (GD2), and in parallel to the axis (Jgd1) and the axis (Jgd2).

The rotation axis Jsf of the shaft member SFT matches the axis Jps of the pressing member PSN (coaxial), and Jsf is arranged at the center between Jgd1 and Jgd2. Thus, the friction members (brake pads) MSB may be evenly pressed against the rotation member (brake disk) KTB.

Moreover, according to the embodiment of the present invention, the position acquisition means (MKA) for acquiring the position (Mka) of the electric motor (MTR) is provided. The position acquisition means (MKA) may be arranged coaxially with the motor axis (Jmt).

The motor axis Jmt is arranged inside Mtk so as to be orthogonal to Mtk. Therefore, in the above-mentioned configuration, the position acquisition means (MKA) is also arranged inside Mtk so as to be orthogonal to Mtk. Accordingly, the influence of the vibration on the position acquisition means (rotational angle sensor) MKA may be suppressed, and thus, the improvement in the reliability of MKA and the reduction in the noise of Mka may be achieved.

Moreover, according to the embodiment of the present invention, the electric motor (MTR) includes the brushes (BLC) and the commutator (CMT). The brushes (BLC) and the commutator (CMT) may be arranged coaxially with the motor axis (Jmt).

When the brushed motor is employed as the electric motor MTR, the motor brushes BLC are pressed against the commutator CMT by the springs. The motor axis Jmt is arranged inside Mtk so as to be orthogonal to Mtk. Thus, in the above-mentioned configuration, the commutator CMT and the motor brushes BLC are also arranged inside Mtk so as to be orthogonal to Mtk. Thus, regarding the motor brushes BLC and the commutator CMT, the amplification of the road surface vibration may be suppressed. Thus, for the vibration caused by the road surface irregularities during the vehicle travel, the forces for pressing the motor brushes BLC against the commutator CMT (that is, the spring constants of the springs for pressing) do not need to be increased. As a result, the torque loss caused by wears of the motor brushes BLC may be reduced in the electric motor MTR, and an efficiency of the brake actuator BRK may be increased.

The invention claimed is:

1. A vehicle electric braking device configured to press a friction member via an electric motor against a rotation member fixed to a wheel of a vehicle, to thereby generate a braking torque for the wheel, the vehicle electric braking device comprising:
a mount member fixed to a support member configured to support the wheel;
a first guide member fixed to the mount member, and having an axis;
a second guide member fixed to the mount member at a position different from a position of the first guide member, and having an axis parallel to the axis of the first guide member;
a caliper supported by the first guide member and the second guide member, the caliper being movable relative to the first guide member and the second guide member in an axial direction of the first guide member and the second guide member;
a first fastening member configured to fix the mount member to the support member, and having an axis parallel to the axis of the first guide member;
a second fastening member configured to fix the mount member to the support member at a position different from a position of the first fastening member, and having an axis parallel to the axis of the first guide member;
a shaft member to be rotationally driven by the electric motor about a shaft axis different from a motor axis that is a rotation axis of the electric motor; and
a conversion member configured to convert a rotational motion of the shaft member about the shaft axis into a translational motion of the friction member with respect to the rotation member,
wherein the electric motor is fixed to the caliper,
wherein, when viewed from the axial direction of the first guide member, the motor axis is positioned inside a fastening quadrangle, which is a quadrangle having a plane that has four corners corresponding to respective positions of the axis of the first guide member, the axis of the second guide member, the axis of the first fastening member, and the axis of the second fastening member, the plane being perpendicular to the axis of the first guide member, the motor axis being orthogonal to the plane of the fastening quadrangle,
wherein the motor axis is closer than the shaft axis to a rotation axis of the rotation member, and
wherein the braking torque is generated based on an operation amount of a brake pedal.

2. A vehicle electric braking device according to claim 1, wherein the shaft axis is parallel to the motor axis.

3. A vehicle electric braking device configured to press a friction member via an electric motor against a rotation member fixed to a wheel of a vehicle, to thereby generate a braking torque for the wheel, the vehicle electric braking device comprising:
a mount member fixed to a support member configured to support the wheel;
a first guide member fixed to the mount member, and having an axis;
a second guide member fixed to the mount member at a position different from a position of the first guide member, and having an axis parallel to the axis of the first guide member;
a caliper supported by the first guide member and the second guide member, the caliper being movable relative to the first guide member and the second guide member in an axial direction of the first guide member and the second guide member;
a first fastening member configured to fix the mount member to the support member, and having an axis parallel to the axis of the first guide member;

a second fastening member configured to fix the mount member to the support member at a position different from a position of the first fastening member, and having an axis parallel to the axis of the first guide member;

a shaft member to be rotationally driven by the electric motor about a shaft axis different from a motor axis that is a rotation axis of the electric motor; and a conversion member configured to convert a rotational motion of the shaft member about the shaft axis into a translational motion of the friction member with respect to the rotation member, wherein the electric motor is fixed to the caliper, wherein, when viewed from the axial direction of the first guide member, the motor axis is positioned inside a fastening quadrangle, which is a quadrangle having a plane that has four corners corresponding to respective positions of the axis of the first guide member, the axis of the second guide member, the axis of the first fastening member, and the axis of the second fastening member, the plane being perpendicular to the axis of the first guide member, the motor axis being orthogonal to the plane of the fastening quadrangle, wherein the motor axis is closer than the shaft axis to a rotation axis of the rotation member, wherein the braking torque is generated based on an operation amount of a brake pedal, and wherein a pressing force sensor for detecting a pressing force is provided on the shaft axis, a rotational angle sensor for detecting a rotational angle of the electric motor is provided on the motor axis, and the electric motor is controlled based on the pressing force and the rotational angle.

4. A vehicle electric braking device according to claim 3, wherein the shaft axis is parallel to the motor axis.

* * * * *